(12) United States Patent
Shin et al.

(10) Patent No.: US 11,616,938 B2
(45) Date of Patent: Mar. 28, 2023

(54) METHOD FOR PROCESSING IMMERSIVE VIDEO AND METHOD FOR PRODUCING IMMERSIVE VIDEO

(71) Applicant: Electronics and Telecommunications Research Institute, Daejeon (KR)

(72) Inventors: Hong Chang Shin, Daejeon (KR); Gwang Soon Lee, Daejeon (KR); Ho Min Eum, Daejeon (KR); Jun Young Jeong, Seoul (KR); Kug Jin Yun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 156 days.

(21) Appl. No.: 17/033,227

(22) Filed: Sep. 25, 2020

(65) Prior Publication Data

US 2021/0099687 A1 Apr. 1, 2021

(30) Foreign Application Priority Data

Sep. 26, 2019 (KR) .................. 10-2019-0119175
Sep. 30, 2019 (KR) .................. 10-2019-0121085
Oct. 2, 2019 (KR) .................. 10-2019-0121977
Jan. 13, 2020 (KR) .................. 10-2020-0004454
Sep. 24, 2020 (KR) .................. 10-2020-0123797

(51) Int. Cl.
*H04N 13/178* (2018.01)
*H04N 13/156* (2018.01)
*H04N 19/46* (2014.01)

(52) U.S. Cl.
CPC ......... *H04N 13/178* (2018.05); *H04N 13/156* (2018.05); *H04N 19/46* (2014.11)

(58) Field of Classification Search
CPC .... H04N 13/178; H04N 13/156; H04N 19/46; H04N 19/17; H04N 19/597; H04N 19/37
See application file for complete search history.

(56) References Cited

U.S. PATENT DOCUMENTS

| | | | |
|---|---|---|---|
| 2012/0122062 A1 | 5/2012 | Yang et al. | |
| 2015/0317057 A1 | 11/2015 | Choi et al. | |
| 2021/0006834 A1* | 1/2021 | Salahieh | H04N 19/597 |

(Continued)

FOREIGN PATENT DOCUMENTS

| | | |
|---|---|---|
| KR | 101791919 B1 | 11/2017 |
| KR | 101838320 B1 | 3/2018 |

(Continued)

OTHER PUBLICATIONS

Oh (English translation of WO 2020251154 A1) (Year: 2019).*

(Continued)

*Primary Examiner* — Rebecca A Volentine
(74) *Attorney, Agent, or Firm* — William Park & Associates Ltd.

(57) ABSTRACT

Disclosed herein is an immersive video processing method. The immersive video processing method includes: determining a priority order of pruning for input videos; extracting patches from the input videos based on the priority order of pruning; generating at least one atlas based on the extracted patches; and encoding metadata. Herein, the metadata may include information on a priority order of pruning among input videos.

10 Claims, 17 Drawing Sheets

(56) References Cited

U.S. PATENT DOCUMENTS

2021/0409670 A1* 12/2021 Oh .................... H04N 13/161

FOREIGN PATENT DOCUMENTS

| WO | 2011090798 A1 | 7/2011 |
| WO | 2012033965 A1 | 3/2012 |

OTHER PUBLICATIONS

Kim et al. (English Translation of KR 20210006307 A) (Year: 2019).*
Test Model 2 for Immersive Video, Coding of moving pictures and audio, ISO/IEC JTC 1/SC 29/WG 11, N18577, Jul. 2019, International Organisation for Standardisation, Gothenburg, SE.

* cited by examiner

METHOD FOR PROCESSING IMMERSIVE VIDEO AND METHOD FOR PRODUCING IMMERSIVE VIDEO

CROSS REFERENCE TO RELATED APPLICATION

The present application claims priority to Korean Patent Applications No. 10-2019-0119175 filed Sep. 26, 2019, 10-2019-0121085 filed Sep. 30, 2019, 10-2019-0121977 filed Oct. 2, 2019, 10-2020-0004454 filed Jan. 13, 2020, and 10-2020-0123797 filed Sep. 24, 2020, the entire contents of which are incorporated herein for all purposes by this reference.

BACKGROUND OF THE INVENTION

Field of the Invention

The present disclosure relates to a processing/outputting method for an immersive video supporting motion parallax for rotational and translation motions.

Description of the Related Art

Virtual reality service evolves towards maximizing senses of immersion and realism by generating an omni-directional video in realistic or CG (Computer Graphics) format and reproducing the video on an HMD (Head Mounted Display), a smart phone and the like. It is currently known that 6 DoF (Degrees of Freedom) needs to be supported in order to play a natural and highly immersive omni-directional video through an HMD. A 6 DoF video provided on an HMD should be a free video in six directions including (1) the horizontal movement, (2) the vertical rotation, (3) the vertical movement and (4) the horizontal rotation. However, most omni-directional videos based on real images are currently supporting only rotational movements. Therefore, researches on such technical fields as the acquisition and reproduction of 6 DoF omni-directional videos are actively under way.

SUMMARY OF INVENTION

The present invention is directed to provide a method of determining a priority order of pruning among source videos.

Also, the present disclosure is directed to provide a method of encoding information on a priority order of pruning among source videos as metadata.

The technical objects of the present disclosure are not limited to the above-mentioned technical objects, and other technical objects that are not mentioned will be clearly understood by those skilled in the art through the following descriptions.

An immersive video synthesizing method according to the present disclosure may include: parsing video data and metadata from a bitstream; obtaining at least one atlas by decoding the video data; and extracting patches required for viewport video synthesis according to a user movement from the atlas based on metadata. Herein, the metadata may include information on a priority order of pruning among input videos.

In an immersive video synthesizing method according to the present disclosure, the information on the priority order of pruning may include a flag indicating whether an input video is a leaf node or a root node.

In an immersive video synthesizing method according to the present disclosure, when the flag indicates that the input video is not a leaf node or a root node, the information on the priority order of pruning may further include information on the number of next priority input videos and information for identifying the next priority input videos.

In an immersive video synthesizing method according to the present disclosure, when creating the viewport video, a weight allocated to each input video may be determined based on the priority order of pruning.

In an immersive video synthesizing method according to the present disclosure, when creating the viewport video, a weight allocated to a parent node input video may have a greater value than a weight allocated to a child node.

In an immersive video synthesizing method according to the present disclosure, the metadata may include partition information on the atlas. When the atlas is partitioned into a plurality of tiles, the metadata may further include information for identifying a tile to which the patch belongs.

The features briefly summarized above with respect to the present disclosure are merely exemplary aspects of the detailed description below of the present disclosure, and do not limit the scope of the present disclosure.

According to the present disclosure, a priority order of pruning of source videos may be variable.

According to the present disclosure, a method of encoding and signaling a priority order of pruning among source videos may be provided.

Effects obtained in the present disclosure are not limited to the above-mentioned effects, and other effects not mentioned above may be clearly understood by those skilled in the art from the following description.

DETAILED DESCRIPTION OF THE INVENTION

Figure 1:
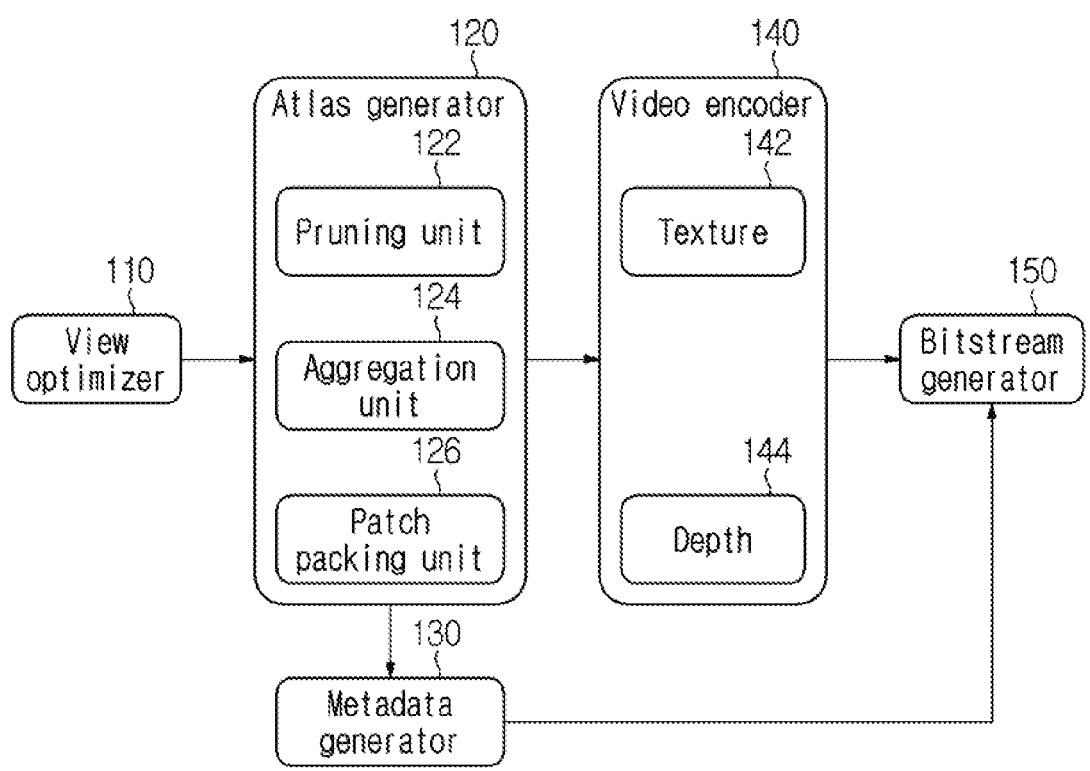
FIG. 1 is a block diagram of an immersive video processing apparatus according to an embodiment of the present disclosure.

A variety of modifications may be made to the present disclosure and there are various embodiments of the present disclosure, examples of which will now be provided with reference to drawings and described in detail. However, the present disclosure is not limited thereto, although the exemplary embodiments can be construed as including all modifications, equivalents, or substitutes in a technical concept and a technical scope of the present disclosure. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the embodiment. The following detailed description is, therefore, not to be taken in a limiting sense, and the scope of the exemplary embodiments is defined only by the appended claims, appropriately interpreted, along with the full range of equivalents to what the claims claim.

Terms used in the present disclosure, 'first', 'second', etc. may be used to describe various components, but the components are not to be construed as being limited to the terms. The terms are only used to differentiate one component from other components. For example, the 'first' component may be named the 'second' component without departing from the scope of the present disclosure, and the 'second' component may also be similarly named the 'first' component. The term 'and/or' includes a combination of a plurality of relevant items or any one of a plurality of relevant items.

When an element is simply referred to as being 'connected to' or 'coupled to' another element in the present disclosure, it should be understood that the former element is directly connected to or directly coupled to the latter element or the former element is connected to or coupled to the latter element, having yet another element intervening therebetween. In contrast, when an element is referred to as being "directly coupled" or "directly connected" to another element, it should be understood that there is no intervening element therebetween.

Furthermore, constitutional parts shown in the embodiments of the present disclosure are independently shown so as to represent characteristic functions different from each other. Thus, it does not mean that each constitutional part is constituted in a constitutional unit of separated hardware or software. In other words, each constitutional part includes each of enumerated constitutional parts for better understanding and ease of description. Thus, at least two constitutional parts of each constitutional part may be combined to form one constitutional part or one constitutional part may be divided into a plurality of constitutional parts to perform each function. Both an embodiment where each constitutional part is combined and another embodiment where one constitutional part is divided are also included in the scope of the present disclosure, if not departing from the essence of the present disclosure.

The terms used in the present disclosure are merely used to describe particular embodiments, while not being intended to limit the present disclosure. Singular expressions include plural expressions unless the context clearly indicates otherwise. In the present disclosure, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", other elements than the corresponding element are not excluded, but additional elements may be included in the embodiments of the present disclosure or the technical scope of the present disclosure.

In addition, some of constituents may not be indispensable constituents performing essential functions of the present disclosure but be selective constituents improving only performance thereof. The present disclosure may be implemented by including only the indispensable constitutional parts for implementing the essence of the present disclosure except the constituents used in improving performance. The structure including only the indispensable constituents except the selective constituents used in improving only performance is also included in the scope of the present disclosure.

Hereinafter, embodiments of the present disclosure will be described in detail with reference to the accompanying drawings. In describing exemplary embodiments of the present specification, well-known functions or constructions will not be described in detail since they may unnecessarily obscure the understanding of the present invention. The same constituent elements in the drawings are denoted by the same reference numerals, and a repeated description of the same elements will be omitted.

An immersive video means a video that enables a viewport to dynamically change when a viewing position of a user changes. A plurality of input videos is required to realize an immersive video. Each of the plurality of input videos may be referred to as a source video or a source view.

Immersive videos may be classified into such types as 3 DoF (Degree of Freedom), 3 DoF+, Windowed-6 DoF and 6 DoF. A 3 DoF immersive video may be realized by using only a texture video. On the other hand, not only a texture video but also a depth video is required to render an immersive video including depth information like 3 DoF+ or 6 DoF.

It is assumed that the embodiments described below are directed to process an immersive video including depth information like 3 DoF+ and/or 6 DoF. Also, a source video is assumed to consist of a texture video and a depth video.

FIG. 1 is a block diagram of an immersive video processing apparatus according to an embodiment of the present disclosure.

Referring to FIG. 1, an immersive video processing apparatus according to the present disclosure may include a view optimizer 110, an atlas generator 120, a metadata generator 130, a video encoder 140, and a bitstream generator 150.

The view optimizer 110 classifies source videos into basic videos and additional videos. A basic video, which is a source video with the highest pruning priority, is an unpruned video, and an additional video is a source video with lower pruning priority than the basic video.

The view optimizer 110 may determine at least one of the source videos as a basic video. A source video that is not selected as a basic video may be classified as an additional video.

The view optimizer 110 may determine a basic video by considering the view position of a source video. For example, among a plurality of source videos, a source video with the view position at the center may be selected as a basic video.

Alternatively, the view optimizer 110 may select a basic video based on a camera parameter. Specifically, the view optimizer 110 may select a basic video based on at least one of a camera index, a priority order among cameras, a camera position, and whether or not a camera is a ROI camera.

For example, at least one of the following source videos may be determined as a basic view video: a source video with a smallest camera index, a source video with a largest camera index, a source video having a same camera index as a predefined value, a source video taken through a camera with highest priority, a source video taken through a camera with lowest priority, a source video taken through a camera at a predefined position (e.g., at a center position), and a source video taken through a ROI camera.

Alternatively, the view optimizer 110 may determine a basic video based on the qualities of source videos. For example, a source video with highest quality among source videos may be determined as a basic video.

Alternatively, the view optimizer 110 may examine a degree of data redundancy among source videos and then determine a basic video by considering a proportion of redundant data with other source videos. For example, a source video with a highest or lowest proportion of redundant data with other source videos may be determined as a basic video.

A plurality of source videos may be set as basic videos.

The atlas generator 120 generates a pruning mask by performing pruning. Next, a patch is extracted by using the pruning mask, and an atlas is generated by combining a basic video and/or the extracted patch.

An atlas thus generated may consist of a texture atlas and a depth atlas. The texture atlas represents a video combining a basic texture video and/or texture patches, and a depth atlas represents a video combining a basic depth video and/or depth patches.

The atlas generator 120 may include a pruning unit (pruner) 122, an aggregation unit (aggregator) 124 and a patch packing unit (patch packer) 126.

The pruning unit 122 performs pruning for an additional video based on a priority order of pruning. Specifically, the pruning unit 122 may perform pruning for an additional video by using a reference video that has higher pruning priority than the additional video.

The reference video includes a basic video. In addition, according to the pruning priority of the additional video, the reference video may further include another additional video.

It may be selectively determined whether or not an additional video may be used as a reference video. For example, when it is set that an additional video is not to be used as a reference video, only a basic video may be set as a reference video.

On the other hand, when it is set that other video may be used as a reference video, another additional video that has higher pruning priority than an additional video may be set as a reference video, as well as a basic video.

Through a pruning process, redundant data between an additional video and a reference video may be removed. Redundant data detected from an additional video may be removed. As a result of pruning, a pruning mask may be generated which indicates a non-overlapping region between an additional video and a reference video. A pruning mask may be binary type data indicating non-redundant data of an additional video with a reference video. For example, on a pruning mask, a pixel detected as redundant data may be marked as 0, and a pixel not detected as redundant data may be marked as 1.

Detection of redundant data may be performed by comparing depth videos. Specifically, depth information may be compared between corresponding positions of an additional depth video and a reference depth video respectively. When the difference is equal to or less than a threshold, a corresponding position may detect redundant data between the additional depth video and the reference depth video.

A non-overlapping region may have a non-rectangular shape, while the shape of a patch is limited to rectangle. Accordingly, a patch may include an invalid region as well as a valid region. Herein, the valid region means a region composed of non-redundant pixels between an additional video and a reference video. That is, the valid region represents a region including data that are included in the additional video but not in the reference video. The invalid region means a region that is composed of redundant pixels between the additional video and the reference video. A pixel/data included in the valid region may be referred to as a valid pixel/valid data, and a pixel/data included in the invalid region may be referred to as an invalid pixel/invalid data.

The aggregation unit 124 extracts patches by using a pruning mask. Specifically, the aggregation unit 124 may extract a rectangular region including valid data in an additional video as a patch. As a patch is extracted in a rectangular shape irrespective of a shape of a valid region, a patch extracted from a non-rectangular valid region may include not only valid data but also invalid data.

The aggregation unit 124 may group at least one or more patches.

As for a source video that is not pruned, the entire source video may be treated as one patch. Specifically, an entire 2D video, which develops an unpruned source video in a predetermined projection format, may be set as a single patch. A projection format may include at least one of an equirectangular projection format (ERP), a cube map, and a perspective projection format.

Herein, the unpruned source video means a basic video with highest pruning priority. Alternatively, an additional video without redundant data with a basic video and a reference video may be defined as an unpruned source video. Alternatively, irrespective of whether or not there are redundant data with a reference video, an additional video that is excluded on purpose from a pruning target may also be defined as an unpruned source video. That is, even when an additional video includes redundant data with a reference video, the additional video may be defined as an unpruned source video.

The packing unit 126 may pack each of patches that are clustered on a rectangular video. Packing may be accompanied by transformation of a patch like scaling, rotation and flip. A video, in which patches are packed, may be defined as an atlas.

Specifically, the packing unit 126 may generate a texture atlas by packing a basic texture video and/or texture patches and generate a depth atlas by packing a basic depth video and/or depth patches.

An entire basic video as a single patch may be packed into an atlas video.

The number of atlases generated by the atlas generator 120 may be determined based on at least one of the arrangement of camera rigs, the accuracy of a depth map, and the number of source videos.

The metadata generator 130 generates metadata for view video synthesis. Metadata may include at least one of camera-related data, pruning-related data, atlas-related data and patch-related data.

Pruning-related data include information for determining a priority order of pruning among source videos. For example, at least one of a flag indicating whether or not a source video is a root node and a flag indicating whether or not a source video is a leaf node may be encoded. A root node represents a source video with highest pruning priority (that is, basic video), and a leaf node represents a source video with lowest pruning priority.

When a source video is not a root node, a parent node index may be additionally encoded. The parent node index may represent a video index of a source video that is a parent node.

Alternatively, when a source video is not a leaf node, a child node index may be additionally encoded. The child node index may represent a video index of a source video that is a child node.

Atlas-related data may include at least one of information on the number of atlases, information on a priority order among atlases, a flag indicating whether or not an atlas includes a complete video, and information related to scaling of an atlas.

Patch-related data include a position and/or size of a patch in an atlas video, a source video to which a patch belongs, and information for specifying a position and/or size of a patch in a source video. For example, at least one of positional information indicating a position of a patch in an atlas video and size information indicating a size of a patch in an atlas video may be encoded. In addition, a source index for identifying a source video, from which a patch originates, may be encoded. A source index represents an index of a source video that is an original source of a patch. In addition, positional information indicating a position corresponding to a patch in a source video or size information indicating a size corresponding to a patch in a source video may be encoded.

The video encoder 140 encodes an atlas. The video encoder 140 may include a texture video encoder 140 for encoding a texture atlas and a depth video encoder 144 for encoding a depth atlas.

The bitstream generator 150 generates a bitstream based on encoded video data and metadata. The generated bitstream may be transmitted to an immersive video output apparatus.

Figure 2:
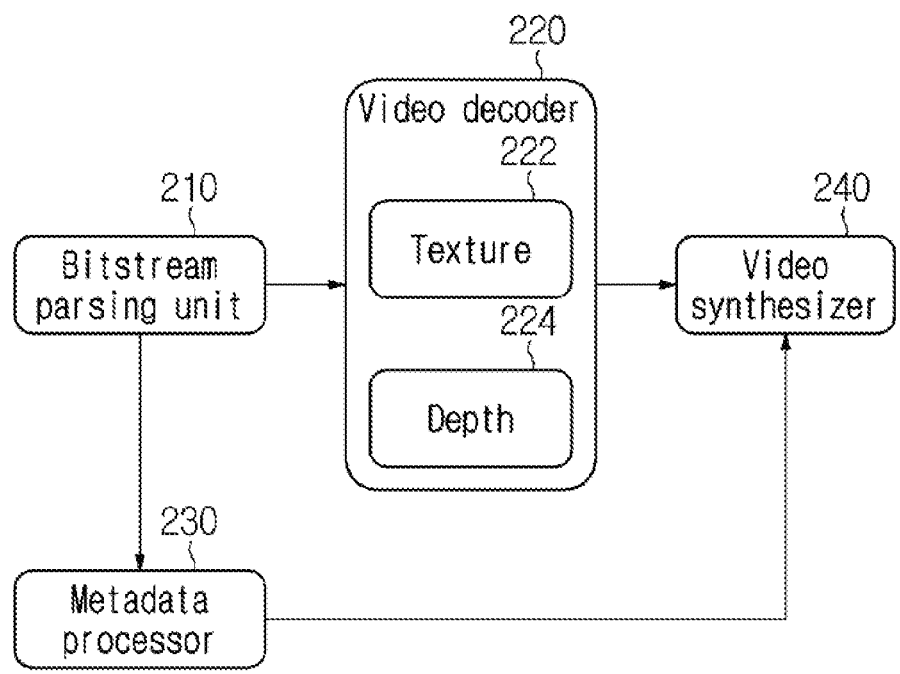
FIG. 2 is a block diagram of an immersive video output apparatus according to an embodiment of the present disclosure.

FIG. 2 is a block diagram of an immersive video output apparatus according to an embodiment of the present disclosure.

Referring to FIG. 2, an immersive video output apparatus according to the present disclosure may include a bitstream parsing unit (parser) 210, a video decoder 220, a metadata processor 230 and a video synthesizer 240.

The bitstream parsing unit 210 parses video data and metadata from a bitstream. Video data may include data of an encoded atlas.

The video decoder 220 decodes parsed video data. The video decoder 220 may include a texture video decoder 222 for decoding a texture atlas and a depth video decoder 224 for decoding a depth atlas.

The metadata processor 230 unformats parsed metadata.

Unformatted metadata may be used to synthesize a view video. For example, when user movement information is input into an immersive video output apparatus, the metadata processor 230 may determine an atlas necessary for video synthesis, patches necessary for video synthesis and/or the positions/sizes of the patches in an atlas in order to reproduce a viewport video according to the user movement.

The video synthesizer 240 may dynamically synthesize a viewport video according to the user movement. Specifically, the video synthesizer 240 may extract patches necessary to synthesize a viewport video from an atlas by using information that is determined in the metadata processor 230 according to the user movement. Specifically, a viewport video may be generated by extracting patches from an atlas including information on a source video necessary for synthesizing the viewport video and the source video within the atlas and by synthesizing the extracted patches.

Figure 3:
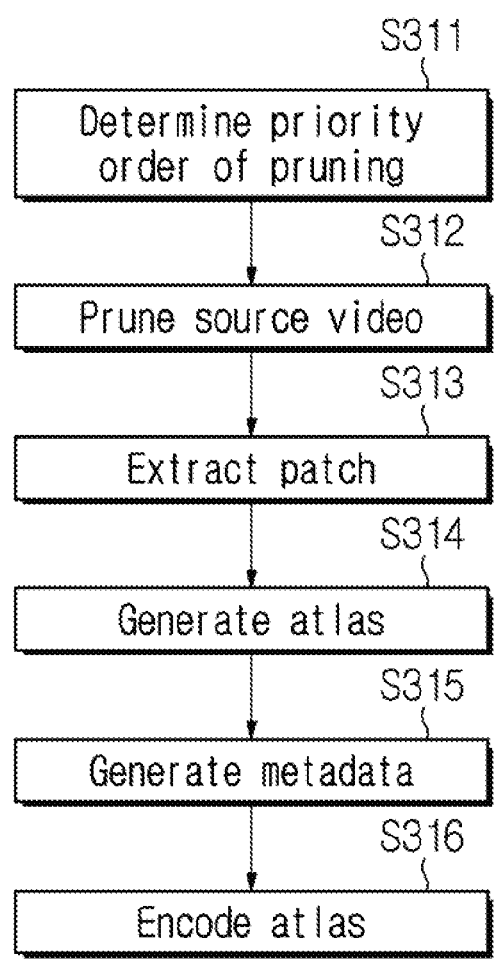
FIG. 3 and FIG. 4 illustrate flow charts of an immersive video processing method and an immersive video outputting method respectively.
Figure 4:
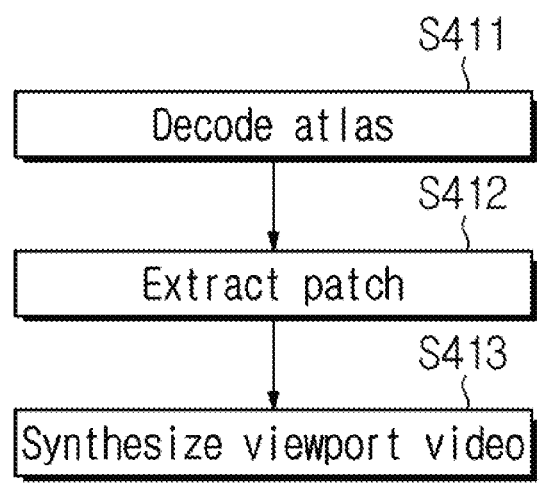

FIG. 3 and FIG. 4 illustrate flow charts of an immersive video processing method and an immersive video outputting method respectively. It is also possible to process or output an immersive video in a different order from the orders described in FIG. 3 and FIG. 4.

An immersive video processing apparatus may determine a priority order of pruning for source videos (S311). Specifically, the source videos may be classified into basic videos and additional videos, and a priority order of pruning may be set among the additional videos.

Then, based on the priority order of pruning, pruning may be performed for the source videos (S312), and patches may be extracted by using a pruning mask that is generated as a result of pruning (S313). As for a source video that is not pruned (for example, a basic video), the entire source video may be treated as one patch.

Then, an atlas may be generated by combining extracted patches (S314), and information on the generated atlas and information on patches included in the atlas may be generated as metadata (S315).

The atlas may be encoded (S316), and the metadata and the encoded atlas may be transmitted to an immersive video output apparatus.

The immersive video output apparatus may extract atlas data by parsing a bitstream, which is received from the immersive video processing apparatus, and decode an atlas based on extracted data (S411).

In addition, when a user movement occurs, an atlas required for synthesizing a viewport video according to the user's movement may be determined based on metadata, and patches included in the atlas may be extracted (S412).

When the patches are extracted, a viewport video may be generated by synthesizing the extracted patches (S413).

Herein, in order to synthesize the generated patches, size/position information of each patch and a camera parameter may be used.

Based on the foregoing description, a video processing method proposed by the present disclosure will be described in further detail.

Figure 5:
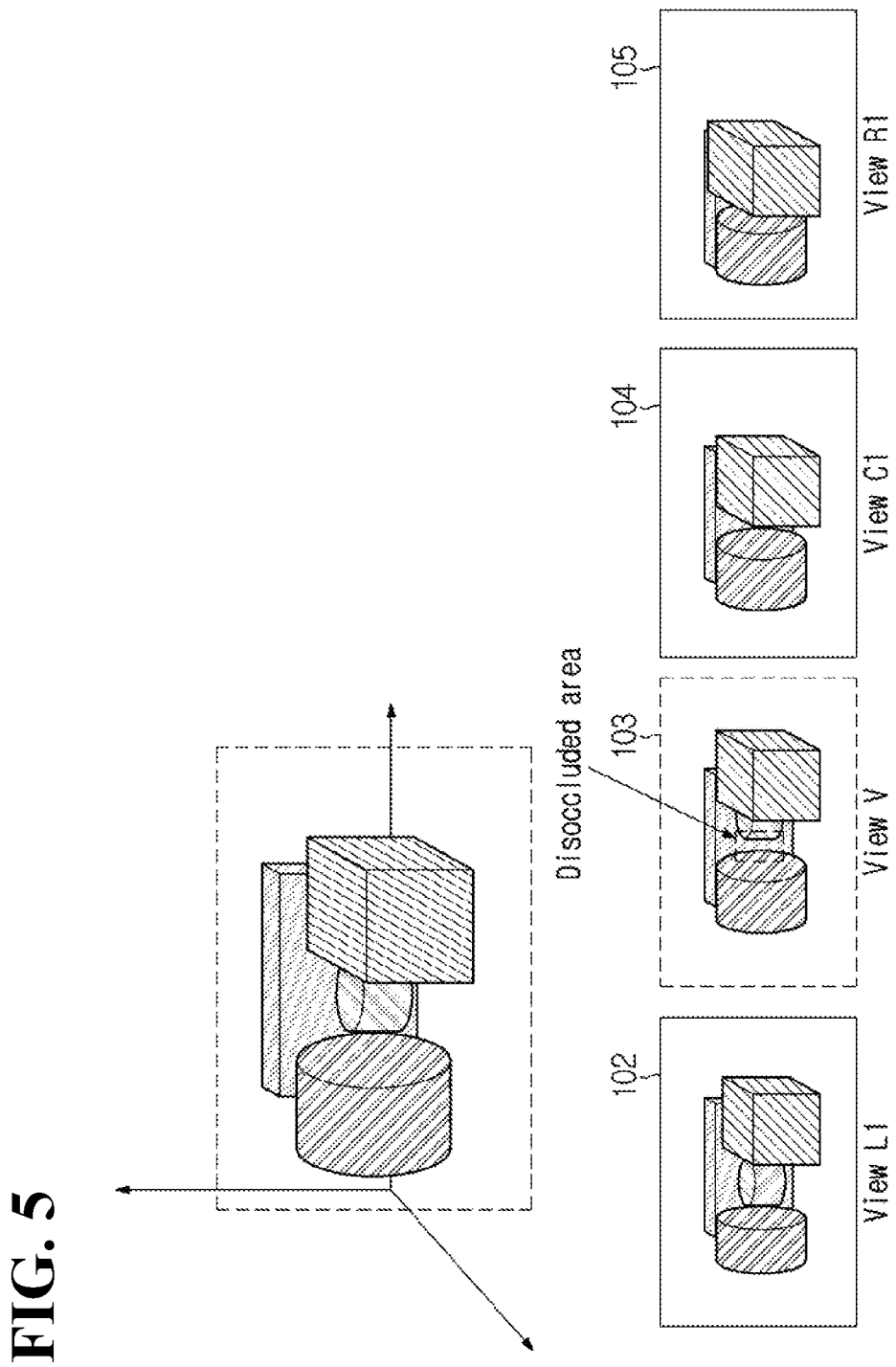
FIG. 5 is a view for describing an example of synthesizing a virtual view video.

FIG. 5 is a view for describing an example of synthesizing a virtual view video.

FIG. 5 illustrates a plurality of source videos having different views from each other.

In the example illustrated, 104 represents a source video covering the center view C1, and 102 and 105 represent source videos covering the left view L1 and the right view R1 of the center view, respectively. 103 represents a virtual view V video between the center view C1 and the left view L1.

The virtual view video View V may be generated by synthesizing adjacent view videos of a virtual view. As an example, when synthesizing a video for the virtual view V, the source video View C1 for the center view adjacent to the virtual view and the source video View L1 for the left view may be used.

As an example, the virtual view video View V includes an occluded area that is not seen in the center view video View C1. As data corresponding to the occluded area are included in the left view video View L1, the virtual view video View V may be synthesized by using the center view video View C1 and the left view video View L1.

Figure 6:
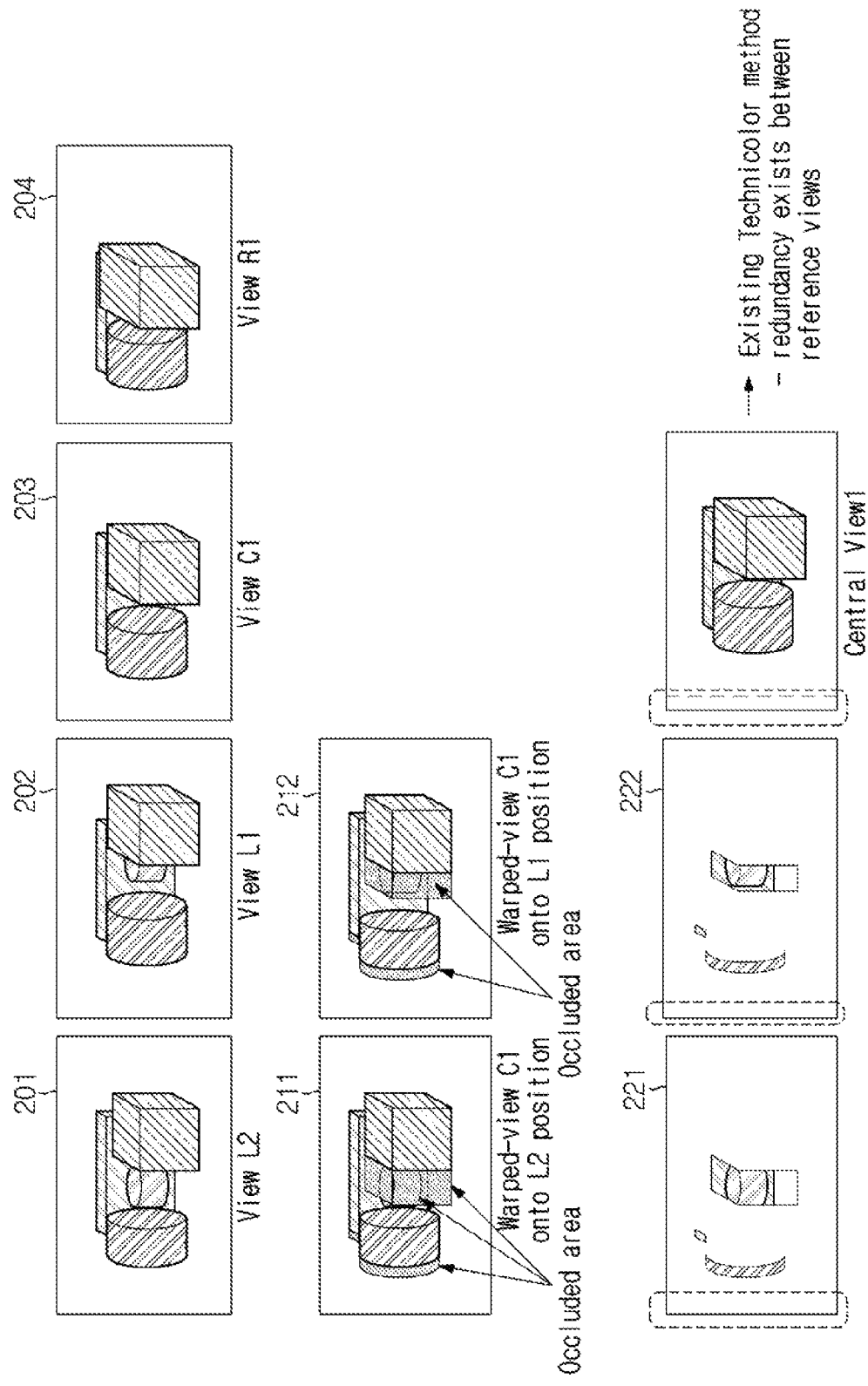
FIG. 6 is a view for describing an example in which a residual video is generated.

FIG. 6 is a view for describing an example in which a residual video is generated. When the center view video View C1 203 is selected as a basic video, the residual source videos (e.g., View L2 201, View L1 202 and View R1 204) other than a reference video may be encoded with redundant data with the basic video being removed.

As an example, when mapping the basic video to the position of each additional video through 3D view warping, the warped videos 211 and 212 may be generated, as illustrated in FIG. 6. Herein, the 3D view warping may be performed based on 3D geometric relationship and depth information.

In the warped videos 211 and 212, an area corresponding to the occluded area in the basic video 203 remains a hole region. The hole region represents a region in which no data exist.

By comparing a warped video and each additional video, redundant data between them may be detected, and redundant data detected from the additional video may be removed. Herein, the detection of redundant data may be performed by comparing at least one of texture data and depth information between pixels having the same coordinate or between pixels mapped within a predetermined adjacent range.

As a result of removing redundant data from an additional video, a residual video Residual View may be generated with redundant data being removed between the additional video and a reference view video. As an example, the residual video 221 for the additional video View L2 may include data on a region that is not seen in the basic video View C1 but is seen in the additional video View L2, and the residual video 222 for the additional video View L1 may include data on a region that is not seen in the basic video View C1 but is seen in the additional video View L1.

In FIG. 5 and FIG. 6, a residual video is shown to be generated for a predetermined additional video with reference to the basic video. In addition, for the predetermined video, a residual video may be generated with reference to another additional video having a different view as well as the basic video.

A priority order of pruning may be determined among source videos, and pruning may be performed by referring to the determined priority order.

Figure 7:
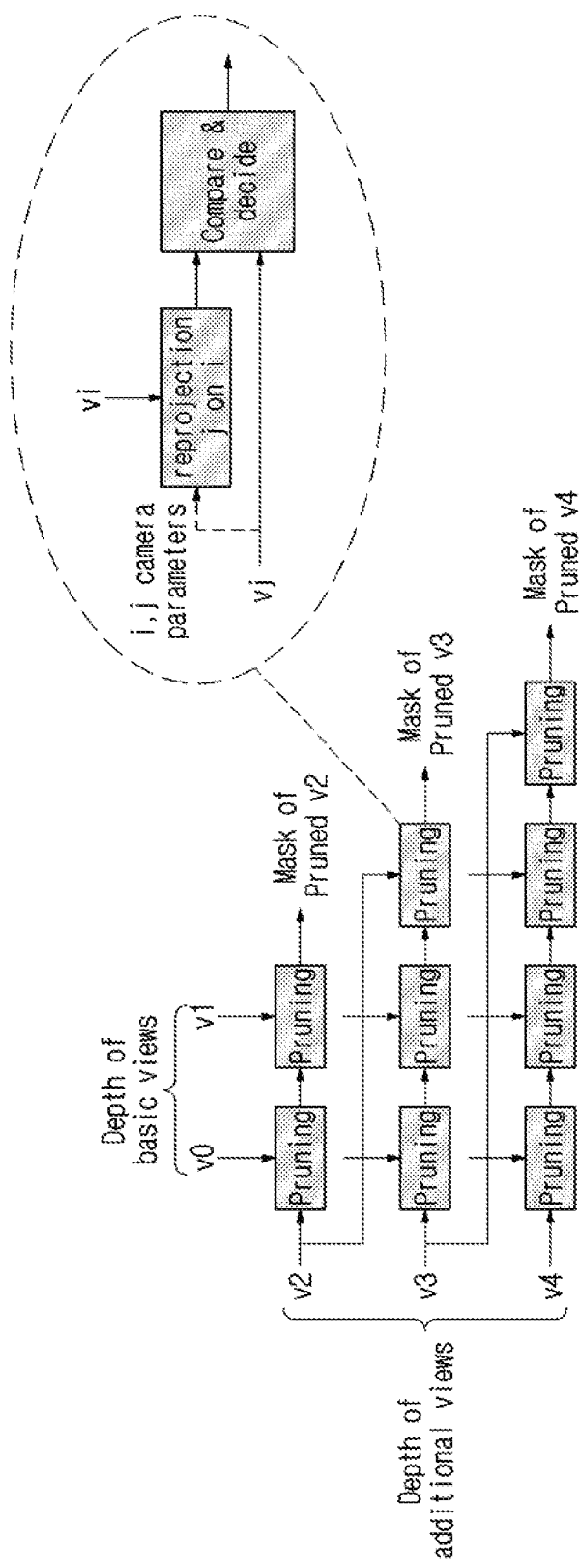
FIG. 7 illustrates a priority order of pruning among source videos.

FIG. 7 illustrates a priority order of pruning among source videos.

In the hierarchy diagram illustrated by FIG. 7, a source video with the highest pruning priority may be defined as a basic video. Also, in the hierarchy diagram, the source video may be set as a root node. The root node means a source video having no parent node in the hierarchy diagram. In the example illustrated in FIG. 7, the source video v0 and the source video v1 are set as basic videos.

The residual source videos other than the basic videos may be set as additional videos. In the hierarchy diagram, among the additional videos, a source video with the lowest pruning priority may be set as a leaf node. The leaf node means a source video having no child node in the hierarchy diagram. In the example illustrated in FIG. 7, the source video v2, the source video v3 and the source video v4 are set as additional videos. Among these source videos, the source video v4 is set as the leaf node.

Since the source video v0 and the source video v1 are basic videos, the video data of each source video are encoded without removing any data. As an example, the source video v0 and the source video v1 may be included in an atlas video as they are.

Since the source video v2, the source video v3 and the source video v4 are additional videos, only residual data, which are generated by removing redundant data with a reference video, are encoded.

As an example, from the source video v2, the pruned mask video v2 may be generated by removing redundant data between the source video v2 and the basic video v0 and redundant data between the source video v2 and the basic video v1.

Next, from the source video v3, the pruned mask video v3 may be generated by removing redundant data between the source video v3 and the basic video v0 and redundant data between the source video v3 and the basic video v1. Meanwhile, in order to additionally remove redundant data between the source video v3 and the source video v2, the pruned mask video v3 may be generated by adding pruning for the source video v2.

Next, from the source video v4, the pruned mask video v4 may be generated by removing redundant data between the source video v4 and the basic video v0 and redundant data between the source video v4 and the basic video v1. Meanwhile, in order to additionally remove redundant data between the source video v4 and the source video v2 and redundant data between the source video v4 and the source video v3, the pruned mask video v4 may be generated by adding pruning for the source video v2 and the source video v3.

As described above, redundant data between a basic video and an additional video may be removed through primary pruning, and redundant data between additional videos may be removed through secondary pruning. Accordingly, a pruning mask for a predetermined additional video may include data that are not seen in an additional video (additional videos).

Meanwhile, in the case of secondary pruning, a pruning aspect may vary according to the priority order of pruning among additional videos. Specifically, based on an additional video with high pruning priority, redundant data for an additional video with lower pruning priority are detected. Accordingly, when the priority order of pruning among additional videos becomes different, for a predetermined additional video, at least one of whether or not redundant data with another additional video with higher priority are present in the predetermined additional video and the size of the redundant data with the additional video with higher priority may become different.

As a result, the priority order of pruning has an effect on the video synthesis quality and the compression efficiency. Therefore, it is necessary to appropriately set a priority order of pruning among source videos.

Figure 8:
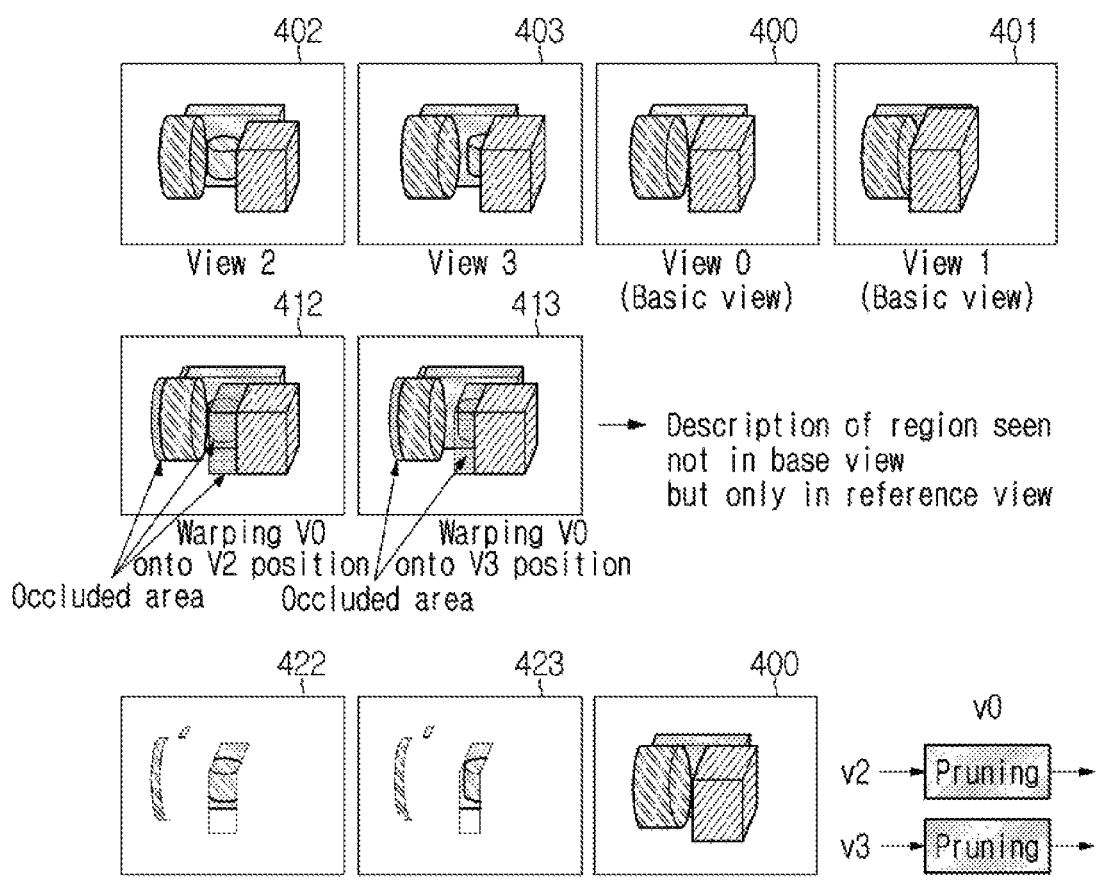
FIG. 8 and FIG. 9 illustrate examples in which pruning results are different according to a priority order of pruning among additional videos.
Figure 9:
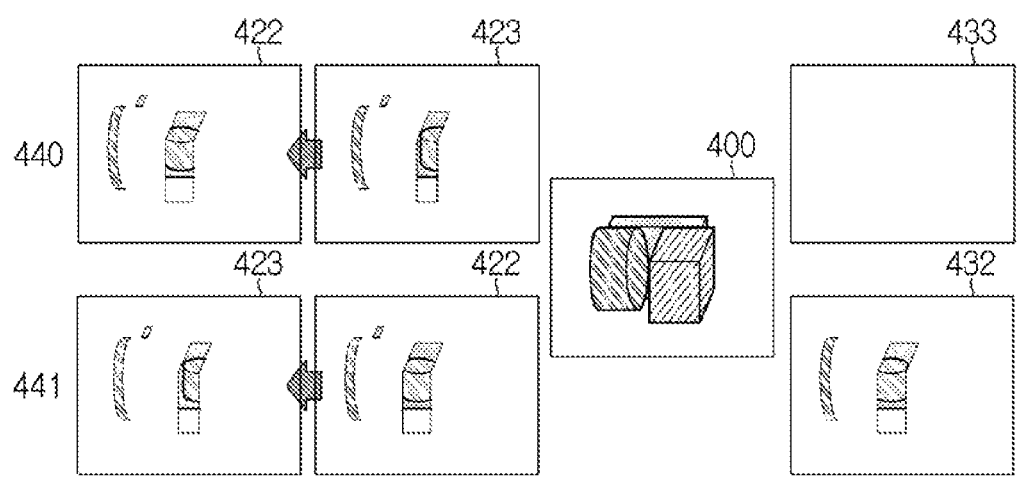

FIG. 8 and FIG. 9 illustrate examples in which pruning results are different according to a priority order of pruning among additional videos.

Through primary pruning, redundant data between an additional video and a basic video may be removed. As an example, as illustrated in FIG. 8, the warped video 412 may be generated by warping the basic video View 0 onto the additional video View 2. The pruned video 422 for the additional video View 2 may be generated by removing redundant data between the additional video View 2 and the warped video 412.

Likewise, the warped video 413 may be generated by warping the basic video View 0 onto the additional video View 3. The pruned video 423 for the additional video View 3 may be generated by removing redundant data between the additional video View 3 and the warped video 413.

Redundant data between additional videos may be removed through secondary pruning. Herein, the generation aspect of pruned videos may be different according to the priority order of pruning among additional videos.

As an example, as illustrated in FIG. 9, when the pruning priority of the additional video View 2 is higher than the pruning priority of the additional video View 3, the ultimate pruned video 433 for the additional video View 3 may be generated by removing redundant data with the pruned video 422 for the additional video View 2 from the pruned video 423 that is generated as a result of primary pruning. In FIG. 9, all the data for the additional video View 3 are removed through secondary pruning with the additional video View 2.

Consequently, the pruned video 422 for the additional video View 2 is encoded by being packed into an atlas, while, for the additional video View 3, all the data are determined as redundant data and thus residual data may not be encoded for the additional video View 3.

On the other hand, when the pruning priority of the additional video View 2 is lower than the pruning priority of the additional video View 3, the ultimate pruned video 432 for the additional video View 2 may be generated by removing redundant data with the pruned video 423 for the additional video View 3 from the pruned video 422 that is generated as a result of primary pruning. In FIG. 9, some data not redundant with the pruned video 423 remain in the ultimate pruned video 422 for the additional video View 2.

Consequently, residual data in the pruned video 432 for the additional video View 2 and residual data in the pruned video 433 for the additional video View 3 may be packed into an atlas and be encoded.

As in the example illustrated, according to the priority order of pruning among additional videos, the generation result of residual data is different. In addition, according to the priority order of pruning, data for a same object within the picture may be dispersedly distributed in a plurality of pruned videos, and data for a same object within a picture may be concentrated in a single pruned video.

As an example, as illustrated in FIG. 9, when the pruning priority of the additional video View 2 is higher than the pruning priority of the additional video View 3, residual data for the cylindrical object within the picture are concentrated in the pruned video 422 for the additional video View 2. On the other hand, when the pruning priority of the additional video View 3 is higher than the pruning priority of the additional video View 2, residual data for the cylindrical object within the picture are dispersedly distributed in the pruned video 422 for the additional video View 2 and the pruned video 423 for the additional video View 3.

When video synthesis is performed by decoding residual data that are packed into an atlas, the dispersed distribution of data of a predetermined in-picture object in a small number of pruned videos may be more advantageous than the dispersed distribution of the data in a plurality of pruned videos with respect to compression efficiency and/or video quality. Accordingly, it is important to appropriately select a priority order of pruning among additional videos.

A priority order of pruning among additional videos may be set in the order of camera number (or video number). However, when the priority order of pruning is set in the order of camera number (or video number), features among the additional videos cannot be reflected. Accordingly, the priority order of pruning may be determined based on not camera numbers (or video numbers) but video features.

Figure 10:
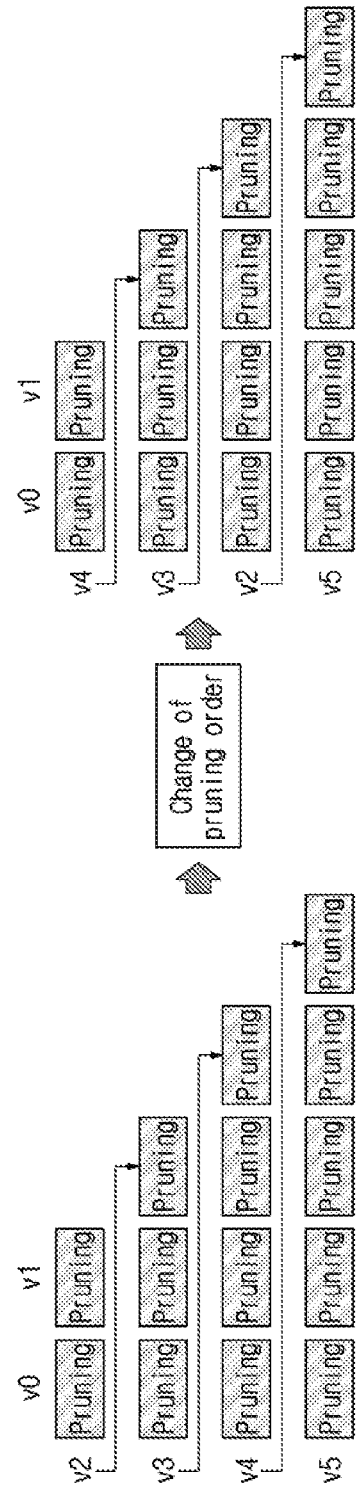
FIG. 10 illustrates an example in which a priority order of pruning among additional videos is differently determined.

FIG. 10 illustrates an example in which a priority order of pruning among additional videos is differently determined.

The left side of FIG. 10 shows an example in which a priority order of pruning is determined in ascending order of video indexes.

Based on video features of additional videos, the priority order of pruning illustrated on the left side of FIG. 10 may be modified to the priority order of pruning illustrated on the right side of FIG. 10.

When pruning is to be performed between source videos that are obtained from cameras with different shooting directions and a small overlap degree in field of view (FOV) accordingly, it is difficult to find an overlapping region between the source videos.

Alternatively, when shooting an immersive video by using a camera arrangement with a large baseline for the direction of x-axis or y-axis, if pruning is intended for source videos obtained from cameras with large physical distancing, it is difficult to find an overlapping region between the source videos.

Thus, when pruning is performed between two source videos for which an overlapping region is hard to detect, even if the pruning is performed, the improvement of video quality or compression quality may be negligible.

In order to solve the problem, the present disclosure proposes a method of setting a priority order of pruning in consideration of the spatial position of each camera. Specifically, the present disclosure proposes a method in which cameras are divided into a plurality of pruning groups based on the spatial position of each camera and pruning is performed independently in each of the pruning groups.

Figure 11:
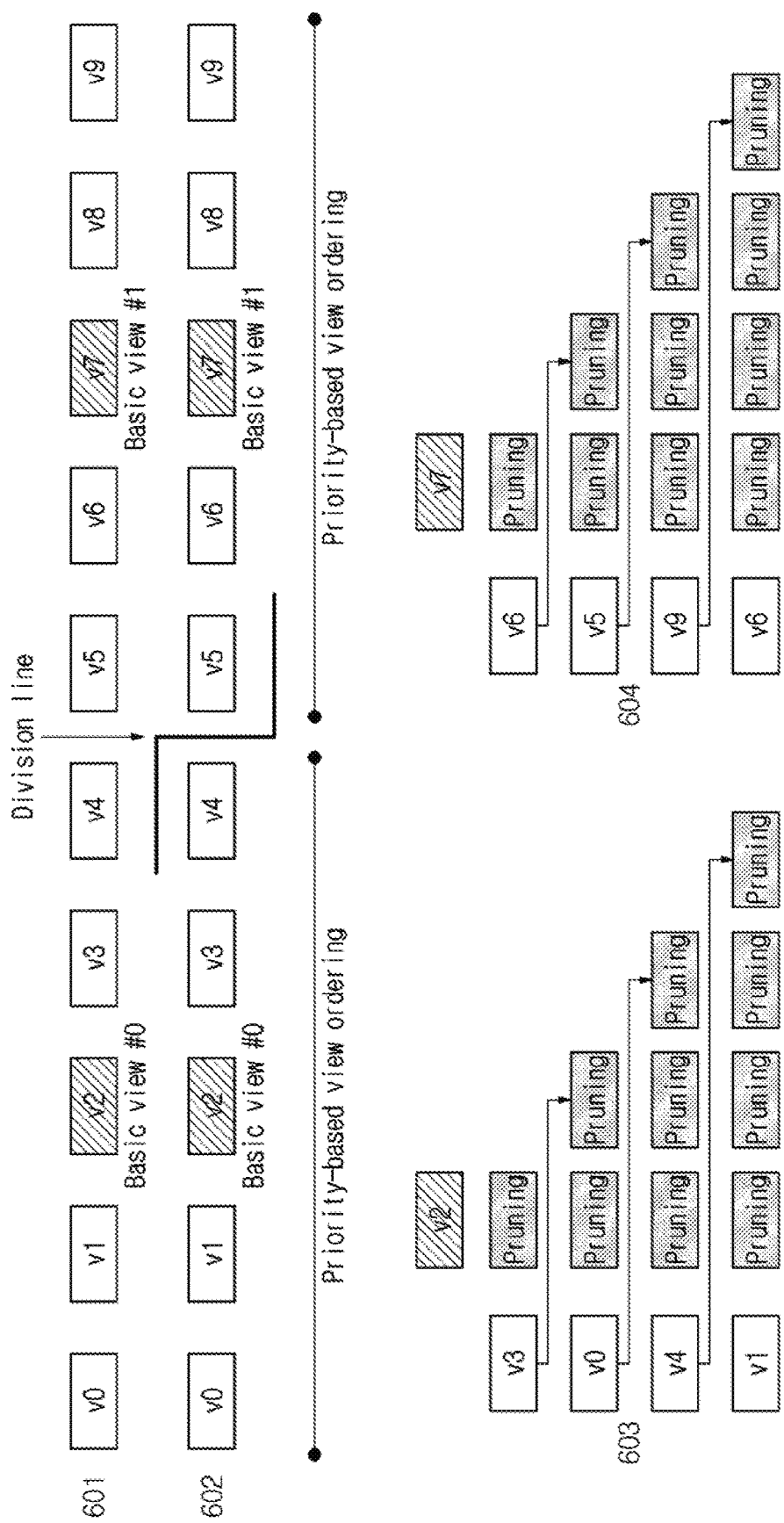
FIG. 11 illustrates an example of classifying source video into a plurality of pruning groups according to an embodiment of the present disclosure.

FIG. 11 illustrates an example of classifying source video into a plurality of pruning groups according to an embodiment of the present disclosure.

In FIG. 11, 10 source videos v0 to v9 with different views are illustrated. For clarity, it is assumed that the source videos are obtained by a one-dimensional camera array in the horizontal direction and the order of camera arrangement is the same as the order of source video arrangement illustrated in FIG. 11.

At least one of the source videos may be determined as a basic video. When a plurality of basic videos is selected, each of the plurality of basic videos may be allocated to different pruning groups.

As an example, as illustrated in FIG. 11, when the source video v2 and the source video v7 are selected as basic videos, the source video v2 may be allocated to the first pruning group 603, and the source video v7 may be allocated to the second pruning group 604.

Next, in consideration of relevance with a basic video, additional videos may be classified. That is, additional videos strongly associated with the basic video v2 may be allocated to the first pruning group 603, and additional videos strongly associated with the basic video v7 may be allocated to the second pruning group 604. Herein, the association may include at least one of an arrangement order of cameras and a size of redundant data between source videos.

In FIG. 11, it is illustrated that the source videos v0 to v4 are allocated to the first pruning group and the source videos v5 to v9 are allocated to the second pruning group.

Pruning may be performed independently in each pruning group. As an example, pruning for a source video belonging to a first pruning group may be performed by setting another source video belonging to the first pruning group as a reference video. On the other hand, pruning for a source video belonging to a second pruning group may be performed by setting another source video belonging to the second pruning group as a reference video.

As described above, a priority order of pruning for source videos in a pruning group may be determined by considering features of each source video.

As illustrated in the example, in the case of pruning of a source video, another source video weakly associated with the source video may be prevented from being used as a reference video by classifying source videos into a plurality of pruning groups and performing pruning independently in each pruning group.

As an example, since a camera (Camera 0) shooting the source video v0 and a camera (Camera 9) shooting the source video v9 are spatially distant from each other, there is a weak spatial association between Camera 0 and Camera 9. Accordingly, the source video v0 and the source video v9 may be allocated to different pruning groups in order to prevent the source video v0 from being used as a reference video of the source video v9 and to prevent the source video v9 from being used as a reference video of the source video v0.

When the source video v0 and the source video v9 having a weak spatial association with each other are set to one group, detecting redundant data between the two videos may cause an error that data not actually redundant are determined as redundant data due to similar depth values. As the number of such an error increases, the quality of image reconstruction decreases. As illustrated in the example, source videos with a strong spatial association may be grouped into one pruning group.

One basic video may be included in a plurality of pruning groups.

Figure 12:
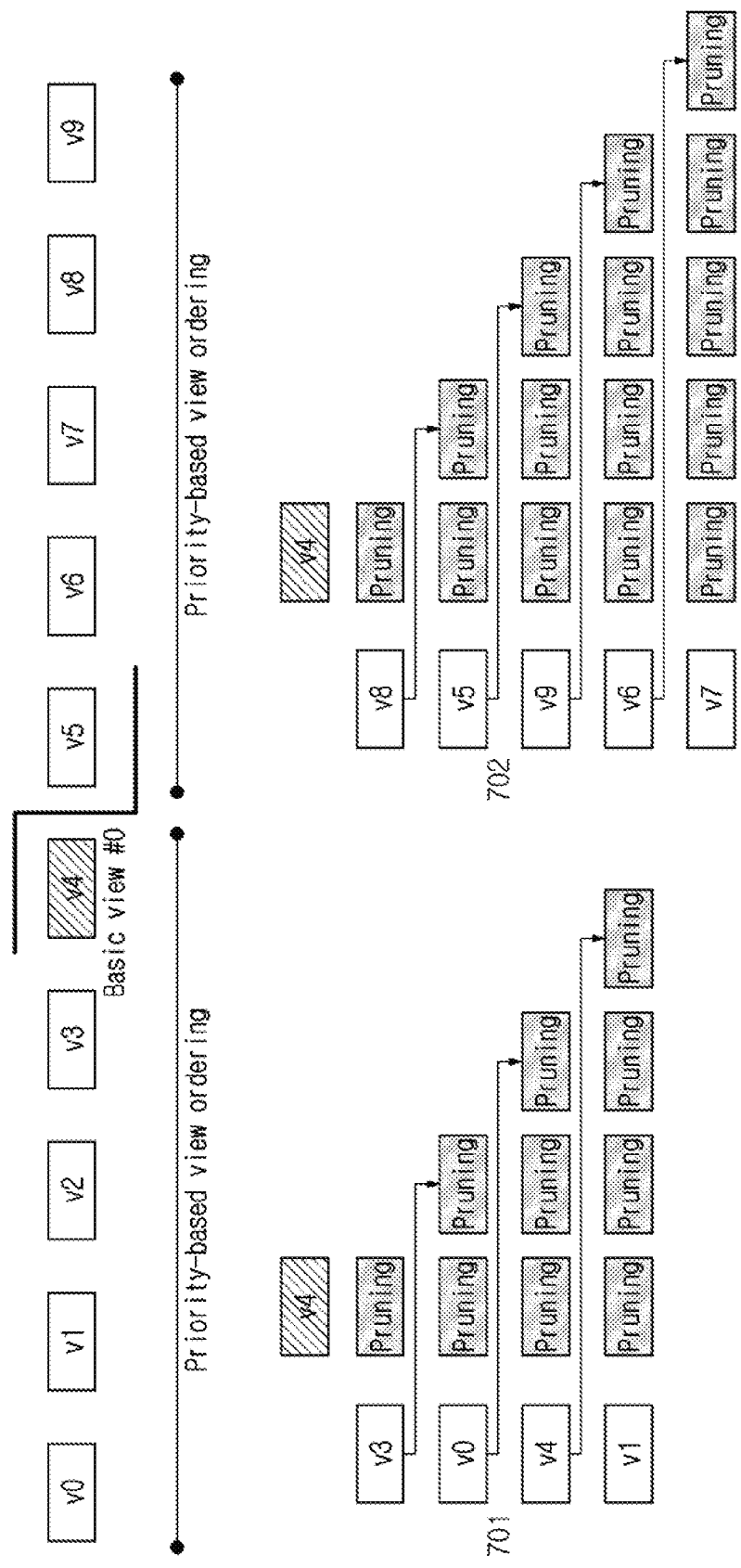
FIG. 12 illustrates an example in which a plurality of pruning groups includes a same basic video.

FIG. 12 illustrates an example in which a plurality of pruning groups includes a same basic video.

At least one basic video may be selected from a plurality of source videos. Herein, it may be set that the selected basic video is included in a plurality of pruning groups. As an example, as illustrated in FIG. 12, when the source video v4 is selected as a basic video, the source video v4 may be set as a basic video of the first pruning group 701, and the source video v4 may be set also as a basic video of the second pruning group 702.

Next, classification for each of additional videos other than the basic video may be performed. Herein, it may be set that an additional video is not repeated allocated to a plurality of pruning groups.

That is, one additional video may not be permitted to be repeatedly included in a plurality of pruning groups, while one basic video may be permitted to be repeatedly included in a plurality of pruning groups.

As an example, as illustrated in FIG. 12, the source videos v0 to v3 are classified as the first pruning group 701, and the source videos v5 to v9 are classified as the second pruning group 702.

As another example, in consideration of pruning priority of an additional video, when the pruning priority of the additional video is higher than a threshold, the additional video may be permitted to be repeatedly allocated to a plurality of pruning groups.

In the example illustrated in FIG. 12, primary pruning for each additional video may be removing a redundant video of the basic video v4. Secondary pruning for each additional video may be performed based on a priority order of pruning among additional videos belonging to a corresponding pruning group.

Herein, as the additional videos are classified into a plurality of pruning groups and pruning is performed independently in each pruning group, when a source video belonging to a particular pruning group is reconstructed, data of a source video belonging to another pruning group need not be referred to.

As an example, in an immersive video output apparatus, when the source video v0 is reconstructed, only source videos belonging to the first pruning group 710 are required, while source videos belonging to the second pruning group 702 are not required.

In the examples illustrated in FIG. 11 and FIG. 12, one pruning group includes one basic video. However, the example is merely illustrative, and it may be set that one pruning group includes a plurality of basic videos. As an example, the number of basic videos included in one pruning group may be set to 1, 2, 3 or above. A maximum number of basic videos that a pruning group may include may be determined based on at least one of a total number of source videos, a total number of pruning groups, the number of source videos included in a corresponding pruning group, and a size of atlas.

In addition, in the example illustrated in FIG. 11, it is set that the number of basic videos and the number of pruning groups are the same. In the example illustrated in FIG. 12, it is set that the number of pruning groups is greater than the number of basic videos. The present disclosure is not limited to the illustrated examples, and the number of basic videos may be greater than the number of pruning groups.

In addition, the number of basic videos may be differently set in each pruning group.

In addition, some of a plurality of basic videos may be set to be repeatedly included in a plurality of pruning groups, and the remaining basic videos may be set not to be repeatedly included in a plurality of pruning groups.

In consideration of a priority order of source videos, source videos with high priority may be set as a separate pruning group.

Figure 13:
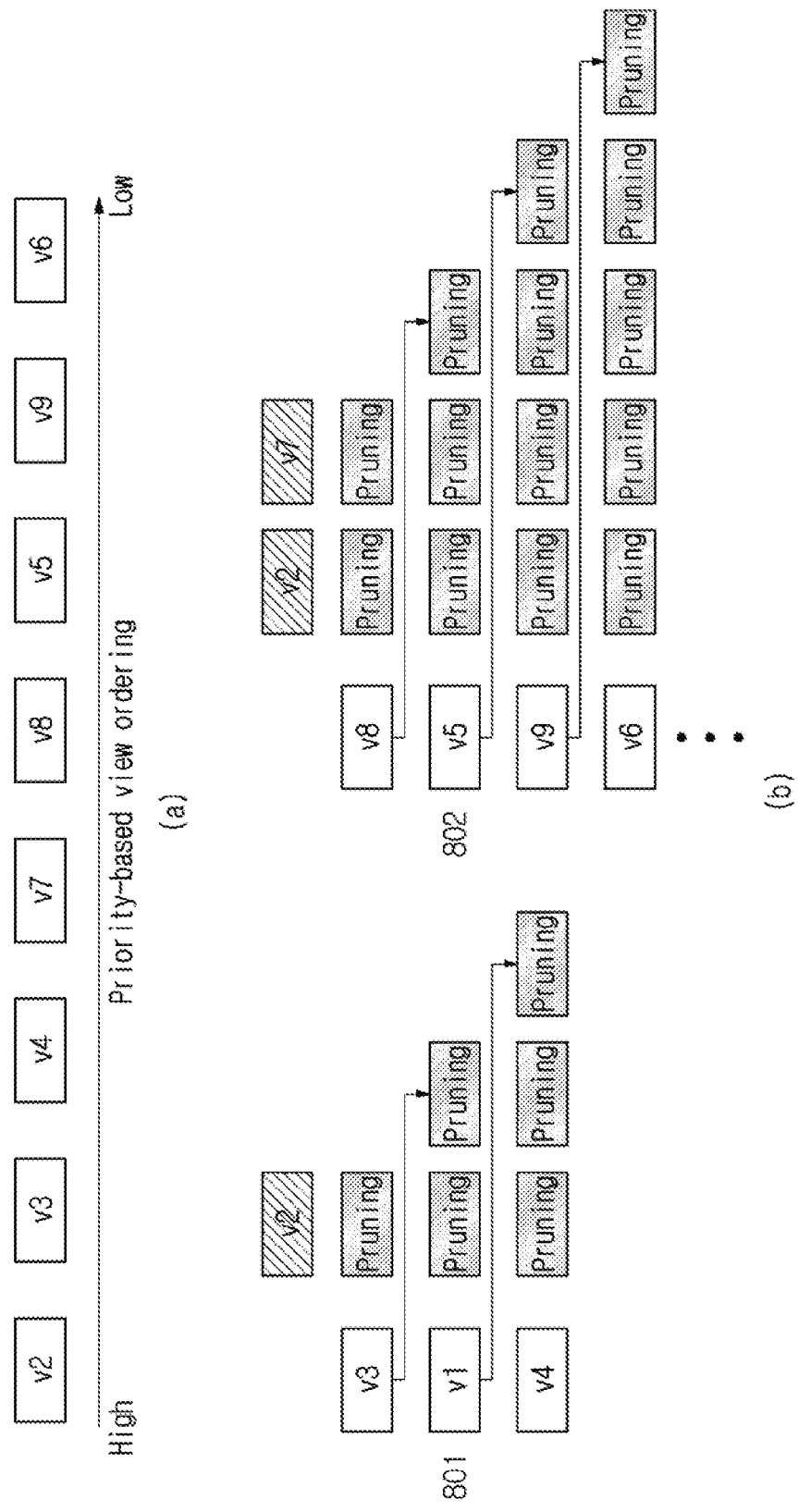
FIG. 13 illustrates an example in which source videos with high priority are set as a separate pruning group.

FIG. 13 illustrates an example in which source videos with high priority are set as a separate pruning group.

For the convenience of explanation, a priority order of source videos is assumed to be as illustrated in (a) of FIG. 13.

A priority order of source videos may be determined based on a size of an overlapping region between source videos, whether or not data related to region of interest (ROI) are included, a size of ROI data, a position of a camera, and a priority order of cameras.

When a priority order of source videos is determined, N source videos with high priority may be set as one pruning group. As an example, when N is 4, the source videos v1 to v4 with high priority may be set as the first pruning group 801.

The remaining source videos may be classified as a separate pruning group. As an example, the remaining source videos other than N videos with high priority may be set as the second pruning group 802.

Herein, a source video belonging to the first pruning group 801 may be included in the second pruning group 802. As an example, as illustrated in (b) of FIG. 13, the source video v2 that is selected as a basic video in the first pruning group 801 may be set to function as a basic video in the second pruning group 802.

Pruning of a source video belonging to the first pruning group 801 may be performed by referring to another source video in the first pruning group 801. Pruning of a source video belonging to the second pruning group 802 may be performed by referring to another source video in the second pruning group 802. That is, pruning may be independently performed for each pruning group.

As in the above-described examples of FIGS. 11 to 13, when a plurality of source videos is classified into a plurality of pruning groups, the number of videos to be referred to decreases when pruning of an additional video. Accordingly, the amount of removed redundant data decreases, which, however, may be a factor improving texture quality in video reconstruction or video synthesis.

Particularly, as in the example illustrated in FIG. 13, by setting source videos with high priority as a separate pruning group, a predetermined region in a scene obtained through a camera may be maintained with high quality. Alternatively, by reducing the reconstruction time of the predetermined region, a video may be synthesized in real time. Alternatively, when an atlas including information on source videos with high priority and an atlas including information on other source videos are separately generated, instead of transmitting all the atlases, only the atlas including information on source videos with high priority may be transmitted. This case has an advantage that a region with higher priority may be reconstructed first.

As a result of pruning, when residual data are generated, an atlas may be generated by packing the residual data. Herein, information indicating whether or not the atlas includes information on a particular video may be encoded. As an example, the flag source_view_flag[v] indicating whether or not the atlas includes information on a source video with index v or the flag pruning_group_flag[g] indicating whether or not the atlas includes information on a pruning group with index g may be signaled.

Alternatively, information indicating whether or not the atlas includes information on a video to be reconstructed first may be encoded. As an example, the flag priority_group_flag indicating whether or not the atlas includes information on a video to be decoded first may be encoded.

A value of the flag priority_group_flag may be determined based on whether an atlas includes a patch derived from a source video with high priority or a pruning group with high priority. As an example, when an atlas includes a patch derived from a source video with higher priority than a threshold, a patch derived from a pruning group with higher priority than the threshold or a patch derived from a pruning group composed of source videos with high priority, the value of the flag priority_group_flag may be set as true. Otherwise, the value of the flag priority_group_flag may be set as false.

Table 1 is an example of syntax table including information for determining a priority order of atlases.

TABLE 1

| atlas_params_list( ) { | |
|---|---|
| num_atlases_minus1 | ue(v) |
| omaf_v1_compatible_flag | u(1) |
| for ( i = 0; i <= num_atlases_minus1; i++ ) { | |
| atlas_id[ i ]; | u(8) |
| priority_group_flag[ i ]; | u(1) |
| atlas_params( atlas_id[ i ] ) | |
| } | |
| } | |

In Table 1, the syntax_num_atlases_minus1 represents the number of atlases. When a plurality of atlases is included, the syntax_priority_group_flag may be encoded and signaled in each atlas.

Not only a patch derived from a source video or a pruning group with priority higher than a threshold but also a patch derived from a source video or a pruning group with priority lower than a threshold may be packed into an atlas. Herein, in each patch of the atlas, information indicating whether or not the patch is derived from a source video or a pruning group with priority higher than the threshold may be encoded. Table 2 presents a syntax table including the information.

TABLE 2

| | Descriptor |
|---|---|
| atlas_params( a ) { | |
| num_patches_minus1[ a ] | u(16) |
| atlas_width[ a ] | u(16) |
| atlas_height[ a ] | u(16) |
| for ( i = 0; i <= num_patches_minus1; i++ ) { | |
| view_id[ a ][ i ] | u(v) |
| priority_view_flag[ a ][ i ] | u(1) |
| patch_width_in_view[ a ][ i ] | u(v) |
| patch_height_in_view[ a ][ i ] | u(v) |
| patch_pos_in_atlas_x[ a ][ i ] | u(v) |
| patch_pos_in_atlas_y[ a ][ i ] | u(v) |
| patch_pos_in_view_x[ a ][ i ] | u(v) |
| patch_pos_in_view_y[ a ][ i ] | u(v) |
| patch_rotation[ a ][ i ] | u(3) |
| } | |
| } | |

In Table 2, the syntax_num_patches_minus1[a] represent the number of patches included in an atlas with index a. The syntax atlas_width[a] and the syntax atlas_height[a] represent the width and height of an atlas respectively.

In each patch, information on a source video from which the patch is derived may be encoded. As an example, view_id[a][i] represents an index of a source video to which i-th patch of a-th atlas belongs.

The syntax priority_view_flag[a][i] indicates whether or not i-th patch of a-th atlas is derived from a source video or a pruning group with priority higher than a threshold. The value of the syntax priority_view_flag[a][i] may be determined based on whether or not the patch is derived from a source video or a pruning group with priority higher than a threshold. As an example, when the atlas is derived from a source video or a pruning group with priority higher than a threshold, the value of the syntax priority_view_flag[a][i] may be set as true. Otherwise, the value of the flag priority_view_flag[a] [i] may be set as false.

As another example, after an atlas is partitioned into a plurality of tiles or tile groups, patches derived from a source video or a pruning group with priority higher than a threshold and patches derived otherwise may be packed into different tiles from each other. Next, information on a tile into which the patches derived from a source video or a pruning group with priority higher than a threshold may be encoded and signaled.

In Table 2, it was illustrated that a priority order of patches was determined using the Boolean type syntax priority_view_flag[a][i]. As another example, a priority order of patches may be determined using integer type information. Table 3 is an example of syntax table including the information.

TABLE 3

| | Descriptor |
|---|---|
| atlas_params( a ) { | |
|   num_patches_minus1[ a ] | u(16) |
|   atlas_width[ a ] | u(16) |
|   atlas_height[ a ] | u(16) |
|   for ( i = 0; i <= num_patches_minus1; i++ ) { | |
|     view_id[ a ][ i ] | u(v) |
|     priority_view_order[ a ][ i ] | u(16) |
|     patch_width_in_view[ a ][ i ] | u(v) |
|     patch_height_in_view[ a ][ i ] | u(v) |
|     patch_pos_in_atlas_x[ a ][ i ] | u(v) |
|     patch_pos_in_atlas_y[ a ][ i ] | u(v) |
|     patch_pos_in_view_x[ a ][ i ] | u(v) |
|     patch_pos_in_view_y[ a ][ i ] | u(v) |
|     patch_rotation[ a ][ i ] | u(3) |
|   } | |
| } | |

In Table 3, the syntax priority_view_order[a][i] represents priority of i-th patch in a-th atlas or a source video to which the i-th patch belongs. As an example, when there are N source videos, a priority order among the source videos may be classified into as many as N steps.

In the case of individual view reconstruction or virtual view synthesis using patches, a weight may be determined based on a priority order among source videos.

Priority order information of source videos may be encoded and signaled. As an example, information on a priority order among source videos may be encoded and signaled through a camera parameter list. Table 4 is an example of syntax table including information on a priority order among source videos.

TABLE 4

| | Descriptor |
|---|---|
| camera_params_list( ) { | |
|   num_cameras_minus1 | u(16) |
|   for ( i= 0; i <= num_cameras_minus1; i++) { | |
|     cam_pos_x[ i ] | u(32) |
|     cam_pos_y[ i ] | u(32) |
|     cam_pos_z[ i ] | u(32) |
|     cam_yaw[i ] | u(32) |
|     cam_pitch[ i ] | u(32) |
|     cam_roll[ i ] | u(32) |
|     cam_priority_order[ i ] | u(16) |
|   } | |
|   intrinsic_params_equal_flag | u(1) |

TABLE 4-continued

| | Descriptor |
|---|---|
|   for ( i = 0; i <= intrinsic_params_equal_flag ? 0 : num_cameras_minus1; i++ ) | |
|     camera_intrinsics( [ i ] ) | |
|   depth_quantization_params_equal_flag | u(1) |
|   for ( i = 0; i <= depth_quantization_equal_flag ? 0 : num_cameras_minus1; i++ ) | |
|     depth_quantization( [ i ] ) | |

In Table 4, the syntax cam_priority_order[i] represents priority of i-th camera. Herein, the i-th camera is used to shoot i-th source video, and the priority of the i-th camera may be set to be the same as the priority of the i-th source video.

Alternatively, a 1-bit flag indicating whether or not a camera is a high-priority camera may be encoded. As an example, when the value of cam_priority_flag[i] is true, it is indicated that the i-th camera and the corresponding i-th source video have relatively high priority. On the other hand, when the value of cam_priority_flag[i] is false, it is indicated that the i-th camera and the corresponding i-th source video have relatively low priority. When determining priority order information for each source video, it is not necessary to encode patch priority order information. As an example, when the source video n to which the i-th patch belongs is determined by the syntax view_id[a][i], it may be determined whether or not the i-th patch is derived from a source video with high priority by referring to priority (e.g., the syntax cam_priority_order[n]) for the source video. Accordingly, even when the syntax priority_view_flag[a][i] shown in Table 2 or the syntax priority_view_order[a][i] shown in Table 3 is not encoded, it may be determined whether or not the i-th patch is derived from a source video with high priority.

In an immersive video processing apparatus, when a plurality of reference videos is used in a process of pruning a predetermined additional video, redundant data between the additional video and each of the plurality of reference videos are removed. However, when the additional video is reconstructed, it is not possible to know with which reference video the removed data are redundant. Accordingly, information on a priority order of pruning may be generated as metadata and be encoded.

Herein, a priority order among source videos may be set to be the same as the priority order of pruning. As an example, the priority order of pruning may be set to be the same as the syntax cam_priority_order[i] shown in Table 4.

Alternatively, the priority order of pruning may be encoded independently of the priority order among source videos. Table 5 is an example of syntax table related to priority order of pruning.

TABLE 5

| | |
|---|---|
| priority_order_pruning_map( ) | |
| for ( i= 0; i <= num_cameras_minus1; i++) { | |
|   num_next_priority_view_minus1 [i] | u(16) |
|   for ( j= 0; j <= num_next_priority_view_minus1[i]; j++) | |
|     next_priority_view_id[ i ][j]} | u(16) |

For another example, information indicating whether or not a priority order among source videos is set to be the same as a priority order of pruning may be encoded. As an example, the syntax priority_order_pruning_equal_flag indicates whether or not a priority order among source videos is the same as a priority order of pruning.

When a priority order among source videos is different from a priority order of pruning, information indicating the pruning priority of each source video may be encoded and signaled. Table 6 is an example of syntax table including the syntax priority_order_pruning_equal_flag.

TABLE 6

| | |
|---|---|
| priority_order_pruning_equal_flag | u(1) |
| for ( i= 0; i <= priority_order_pruning_equal_flag ? 0 : num_cameras_minus1; i++) { | |
| num_next_priority_view_minus1 [i] | u(16) |
| for ( j= 0; j <= num_next_priority_view_minus1[i]; j++) | |
| next_priority_view_id[ i ][j]} | u(16) |

For a predetermined source video, information on a next priority source video of the source video may be encoded. Herein, the next priority source video of the predetermined source video may mean a video used as a reference video during pruning the predetermined source video (that is, a parent node video), or a video using the predetermined source video as a reference video (that is, a child node video).

In the examples of Table 5 and Table 6, the syntax num_next_priority_view_minus1[i] represents the number of next priority source videos of i-th source video. As an example, the syntax num_next_priority_view_minus1[i] may represent a value obtained by subtracting 1 from the number of next priority source videos of i-th source video.

Next, information specifying an index of each next priority source video may be encoded. As an example, the syntax next_priority_view_id[i][j] represents an index of j-th next priority source video.

Information indicating whether each source video is a root node or a leaf node may be additionally encoded. As an example, at least one of a flag indicating whether or not a predetermined source video is a root node and a flag indicating whether or not the predetermined source video is a leaf node may be encoded and signaled.

Information indicating the number of the next priority source videos and information specifying the index of each next priority source video may be encoded only when the predetermined source video is not a root node or a leaf node.

By encoding information related to a priority order of pruning, a pruning map (or graph) representing a reference relationship between source videos may be constructed. When reconstructing an individual view, source videos to be referred to for reconstructing the individual view may be determined by referring to the pruning map. In addition, in an immersive video processing apparatus, when reconstructing an individual view video, a weight allocated to each source video may be determined based on a priority order of pruning.

By referring to a priority order of pruning, an individual view video may be reconstructed or a virtual view video may be synthesized. As an example, when reconstructing an individual view video, the video may be reconstructed by extracting redundant data from a patch derived from the video or from a reference video of the video.

For example, in a process of performing pruning, it is assumed that the source videos v1 and v2 are selected as basic videos and the source videos v3 and v4 are set as additional videos. Also, it is assumed that, of the additional videos, the additional video v3 has the highest pruning priority and the additional video v4 has the next pruning priority.

For the additional video v3, residual data may be generated by removing redundant data with the basic videos v1 and v2.

Next, in an immersive video output apparatus, when reconstructing the additional video v3, the residual data (e.g., patch) of the additional video v3 and the redundant data, which are removed in the pruning process, may be used. Herein, based on a priority order of pruning between each video, a weight for data of each video may be determined.

For the additional video v4, residual data may be generated by removing redundant data with the basic video v1, the basic video v2 and the additional video v3.

Next, in an immersive video output apparatus, when reconstructing the additional video v4, the residual data (e.g., patch) of the additional video v4 and the redundant data, which are removed in the pruning process, may be used. Herein, based on a priority order of pruning between each video, a weight for data of each video may be determined.

A virtual view video may be generated by synthesizing a plurality of source videos. As an example, as illustrated in FIG. 5, the virtual view video View V may be generated by synthesizing the center video View C1 and the left video View L1.

Herein, a weight allocated to a source video (e.g., parent node) with higher pruning priority among source videos may be set to have a greater value than a weight allocated to a source video (e.g., child node) with lower pruning priority.

In the examples of Table 5 and Table 6, it may be understood that the additional video v3 with higher pruning priority than the additional video v4 is the parent node of the additional video v4 and the additional video v4 is the child node of the additional video v3.

When it is assumed that the syntax num_next_priority_view_minus1 indicates the number of child nodes, the syntax num_next_priority_view_minus1[v3] for the additional video v3 may be set to 0, and the syntax next_priority_view_id[v3][0] may indicate the additional video v4.

On the contrary, when it is assumed that the syntax num_next_priority_view_minus1 indicates the number of parent nodes, the syntax num_next_priority_view_minus1[v4] for the additional video v4 may be set to 0, and the syntax next_priority_view_id[v4][0] may indicate the additional video v3.

Thus, when pruning priority information is encoded and signaled, in an immersive video processing apparatus, a pruning map may be reconstructed, and a weight allocated to each video or a reference video used for reconstructing a predetermined view video may be determined by referring to the pruning map.

When pruning is performed independently in each pruning group, patches derived from different pruning groups may be set to be packed into different regions within an atlas. That is, it may be set that a patch derived from a second pruning group is not packed into a region in which a patch derived from a first pruning group is packed. Herein, the region in which patches are packed may represent a tile or a tile group. Herein, the tile group may be composed of at least one tile.

Figure 14:
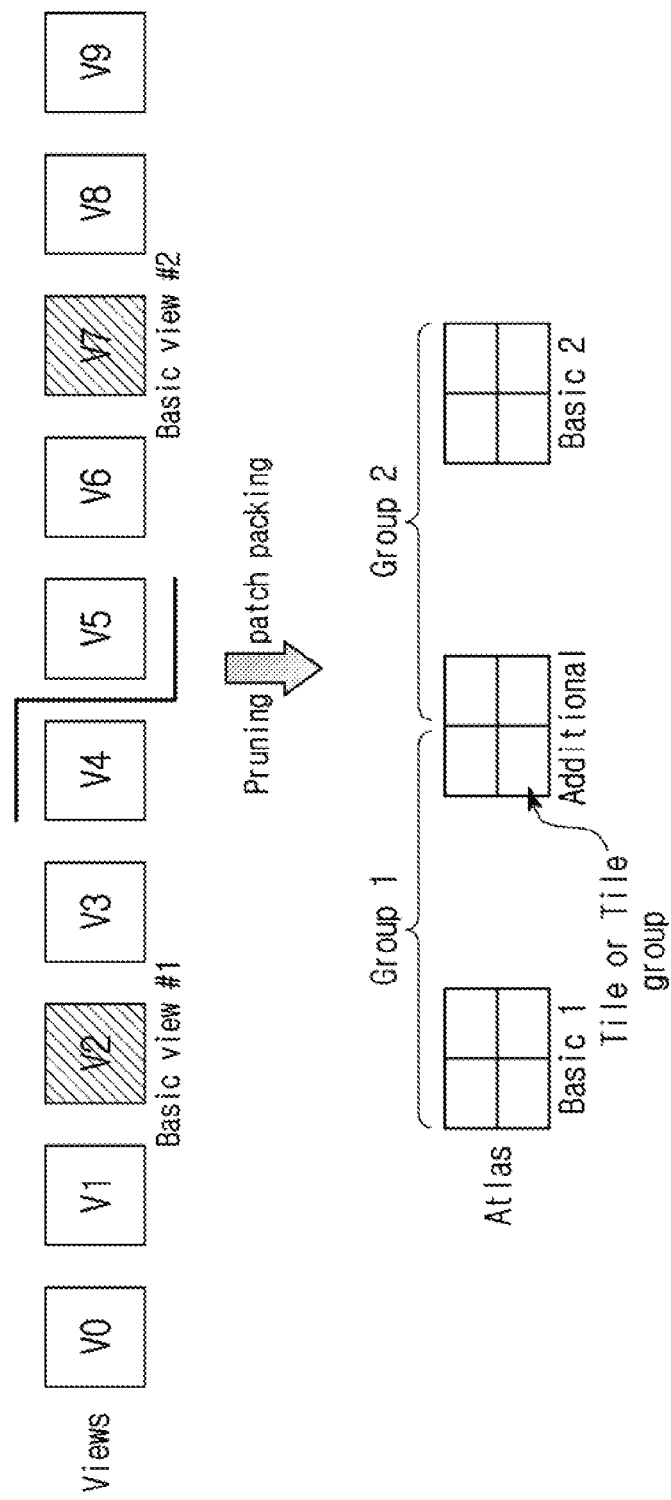
FIG. 14 illustrates an example of packing patches in tile units or tile group units.

FIG. 14 illustrates an example of packing patches in tile units or tile group units.

A basic video without reference video may be inserted into an atlas as it is. As an example, as illustrated in FIG. 14, the basic video v2 (Basic view 1) and the basic video v7 (Basic view) occupy four tiles respectively.

It may be set that a patch derived from the addition videos v5, v6, v8 and v9 belonging to the second pruning group including the basic video v7 is not packed into a tile or a tile group in which a patch derived from the additional videos v0, v1, v3 and v4 belonging to the first pruning group including the basic video v2 is packed.

As an example, as illustrated in FIG. 14, patches derived from the additional videos belonging to the first pruning group may be packed into two left tiles or tile groups, and patches derived from the additional videos belonging to the second pruning group may be packed into two right tiles or tile groups.

As an atlas is partitioned into tiles or tile groups, partial decoding or parallel decoding of the atlas may be supported. Accordingly, a specific view video may be reconstructed by decoding first a tile including information on a source video with high priority or by decoding only a partial region in an atlas.

Information related to atlas partition may be encoded as metadata. Herein, the partition-related information may be information on a tile or a tile group.

Specifically, after encoding a flag indicating whether or not an atlas is partitioned into tiles or tile groups, whether or not to further encode partition information may be determined according to the value of the flag. The flag may be included in an atlas parameter list (atlas_params_list). When the flag indicates that there is a tile or a tile group in an atlas, partition information may be signaled through a tile group parameter (tile_group_params).

Table 7 and Table 8 illustrate syntax tables including information related to atlas partition.

TABLE 7

| | Descriptor |
|---|---|
| atlas_params_list( ) { | |
|   num_atlases_minus1 | ue(v) |
|   num_groups | u(4) |
|   for ( i = 0; i <= num_atlases_minus1; i++ ) { | |
|     atlas_id[ i ] | u(8) |
|     group_id[i] | ue(v) |
|     atlas_params( atlas_id[ i ] ) | |
|       tile_group_params_flag | u(1) |
|       if(tile_group_params_flag) | |
|         tile_group_params_(atlas_id[ i ] ) | |
|   } | |
| } | |

In Table 7, the syntax atlas_id[i] represents an identifier allocated to i-th atlas.

The syntax group_id[i] represents an identifier of an atlas group to which the i-th atlas belongs. It may be understood that atlases with the same value of the syntax group_id belong to a same atlas group.

The syntax tile_group_params_flag indicates whether or not information related to a tile or a tile group is additionally encoded. When the syntax tile_group_params_flag is 1, partition information may be parsed from the tile group parameter (tile_group_params[i]) for the i-th atlas.

TABLE 8

| | Descriptor |
|---|---|
| tile_group_params( a ) { | |
| num_tile_group_column_minus1 | u(16) |
| num_tile_group_row_minus1 | u(16) |
| for ( i = 0; i <= num_tile_group_column_minus1; i++ ) { | u(16) |
| tile_group_column_width_minus1[i] | u(v) |
|   for ( j = 0; j <= num_tile_group_row_minus1; j++ ) { | |
|     tile_group_row_height_minus1[j] | u(v) |

TABLE 8-continued

| | Descriptor |
|---|---|
| tile_group_id[i][j] | u(v) |
| tile_group_type[i][j] | u(4) |
| } | |
| } | |
| } | |

In Table 8, the syntax num_tile_group_column_minus1 and the syntax num_tile_group_row_minus1 represent the number of tile group columns and the number of tile group rows in an atlas, respectively. Specifically, the syntax num_tile_group_column_minus1 represents a value obtained by subtracting 1 from the number of tile group columns, and the syntax num_tile_group_row_minus1 represents a value obtained by subtracting 1 from the number of tile group rows.

A total number of tile groups in an atlas may be value obtained by multiplying the number of tile group columns and the number of tile group rows.

For each tile group column, width information may be encoded. As an example, the syntax tile_group_column_width_minus1[i] represents a width of i-th tile group column. For a last tile group column in an atlas, encoding of the syntax tile_group_column_width_minus1 may be skipped. A width of the last tile group column may be derived by subtracting a width of the remaining tile group columns from a width of the atlas.

For each tile group row, height information may be encoded. As an example, the syntax tile_group_row_height_minus1[j] represents a height of j-th tile group. For a last tile group row in an atlas, encoding of the syntax tile_group_row_height_minus1 may be skipped. A height of the last tile group row may be derived by subtracting a height of the remaining tile group rows from a height of the atlas.

In addition, when there is one tile group column in an atlas, encoding of the syntax tile_group_column_width_minus1 and the syntax tile_group_row_height_minus1[j] may be skipped.

The syntax tile_group_id[i][j] represents an identifier allocated to a tile group with tile group column index i and tile group row index j. Tile groups with a same identifier may be configured as a single decoding group, and video decoding or image rendering may be performed in a decoding group unit.

The syntax tile_group_type[i][j] represents a type of a tile group with tile group column index i and tile group row index j. A tile group type indicates whether or not a corresponding tile group includes a basic video or an additional video. Alternatively, a tile group type indicates whether or not a corresponding tile group is to be necessarily used. When an atlas is partitioned into a plurality of tiles or tile groups, information identifying a tile or a tile group to which each patch belongs may be encoded. Table 9 is an example of syntax table including the information.

TABLE 9

| | Descriptor |
|---|---|
| atlas_params( a ) { | |
|   num_patches_minus1[ a ] | u(16) |
|   atlas_width[ a ] | u(16) |
|   atlas_height[ a ] | u(16) |
|   for ( i = 0; i <= num_patches_minus1; i++ ) { | |
|     view_id[ a ][ i ] | u(v) |
|     patch_width_in_view[ a ][ i ] | u(v) |

TABLE 9-continued

| | Descriptor |
|---|---|
|     if (tile_group_params_flag) | |
|         tile_group_id[a][i] | u(v) |
|         patch_height_in_view[ a ][ i ] | u(v) |
|         patch_pos_in_atlas_x[ a][ i ] | u(v) |
|         patch_pos_in_atlas_y[ a ][ i ] | u(v) |
|         patch_pos_in_view_x[ a][ i ] | u(v) |
|         patch_pos_in_view_y[ a ][ i ] | u(v) |
|         patch_rotation[ a ][ i ] | u(2) |
|     } | |
| } | |

In Table 9, the syntax tile_group_id[a] [i] represents an identifier or an index of a tile group to which i-th patch of a-th atlas.

Alternatively, an index of patches may be initialized for each tile or each tile group. Accordingly, each patch in an atlas may be identified by an index of a tile or a tile group, to which the patch belongs, and an index allocated to the patch in the tile or the tile group.

Accordingly, when defining syntax elements for each patch, a tile or tile group index may be used instead of an atlas index. As an example, in Table, the index '[a][i]' for specifying a tile in each syntax may be converted to '[tileIdx][i]'. As an example, view_id[tileIdx][i] may indicates an index of a source video to which a patch with index i in a tile with index tileIdx belongs.

Source videos that are input into an immersive video processing apparatus may be de-projected by using geometric information such as a depth and/or a camera parameter and thus be reconstructed in 3D space. The present disclosure proposes a method of dividing groups based on a world coordinate of each pixel in 3D space.

A de-projection process may be included as a part of pruning process. Accordingly, when inputting a source video in a pruning step (or before inputting), the source video may be de-projected and then group division may be performed according to the de-projection result.

Figure 15:
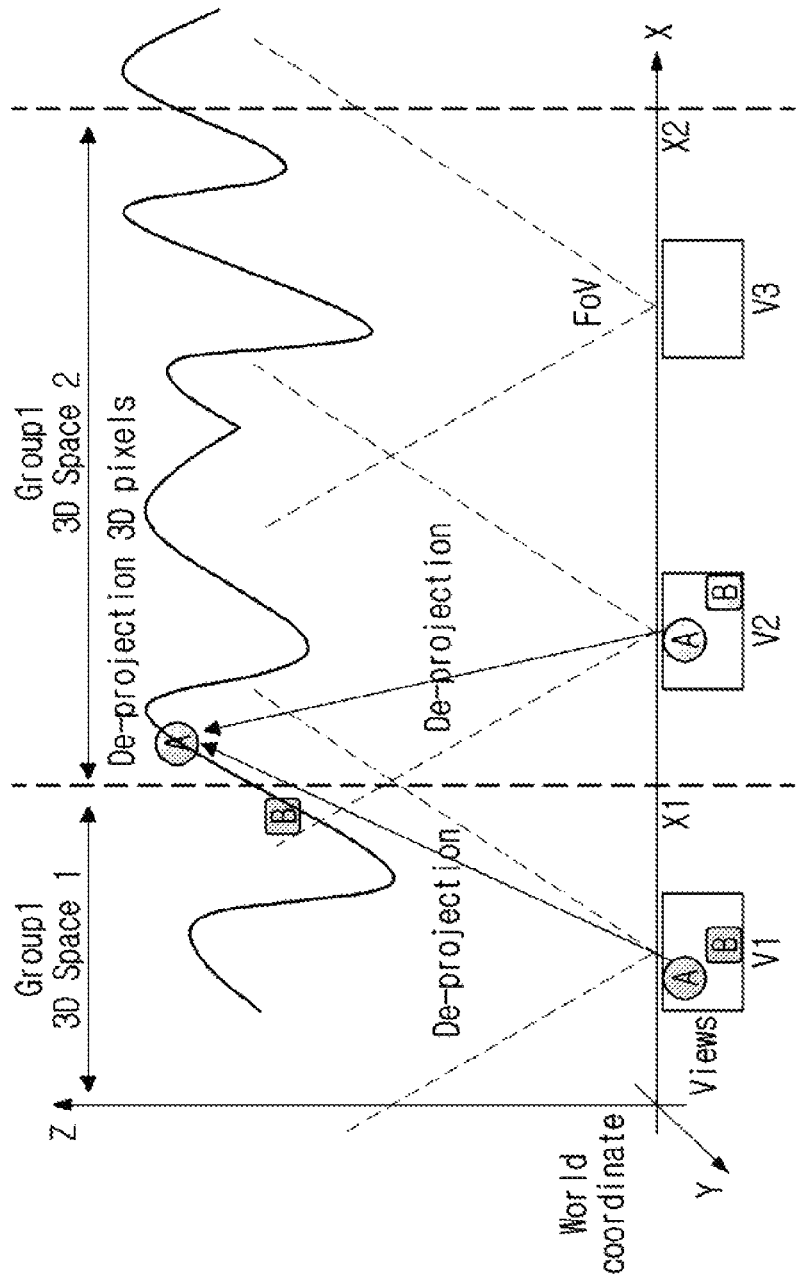
FIG. 15 illustrates an example in which groups are divided in a world coordinate system.

FIG. 15 illustrates an example in which groups are divided in a world coordinate system.

Based on whether or not a world coordinate belongs to a specific range, pixels may be classified into a plurality of groups. As an example, a pixel with X-coordinate smaller than X1 may be classified into a first group, and a pixel included between X1 and X2 may be classified as a second group. In the example illustrated in FIG. 15, since the X-coordinate of the pixel A, which is de-projected from the view video V1, is between X1 and X2, the pixel may be classified as a second group. On the other hand, since the X-coordinate of the pixel B, which is de-projected from the view video V1, is smaller than X1, the pixel may be classified as a first group.

As described above, depending on the position of each pixel in 3D space, even when pixels are included in a same source video or a same patch, the pixels may be classified into different groups.

In the example illustrated in FIG. 15, the group classification was performed by using X-coordinates as criterion. However, the classification criterion may be set based on at least one of X-coordinate, Y-coordinate, Z-coordinate and angle.

When pruning is performed after groups are classified in 3D space, the space information of patches included in the partitioned space have consistency. Thus, video encoding/decoding efficiency may be improved.

Alternatively, after groups are classified in 3D space, when packing is performed in a separate region (e.g., a separate tile) of each classified group or packing is performed in a separate atlas, partial decoding may be easily performed according to a user's choice, and a particular space may be represented using a minimum amount of data.

While groups are classified based on 3D spatial positions, an immersive video may be combined with heterogeneous media. Herein, the heterogeneous media refer to video types like point cloud video and hologram video.

The above-described embodiments illustrated that a residual video, a patch and/or an atlas were generated based on an immersive video consisting of multiple views.

When an immersive video is de-projected into 3D space and heterogeneous media like point cloud are also de-projected into the 3D space, not only data for the immersive video but also data for the heterogeneous media may be expressed by the world coordinate system.

For example, the spatial data of the pixel (x, y, z) of an immersive video and the spatial data of point cloud, which are de-projected in 3D space, may be expressed by the world coordinate system and be processed.

Herein, a process of transforming the data of the point cloud expressed by a local coordinate to the world coordinate system may be performed. As an example, in order to transform the data coordinate system of a point cloud, a content producer may match an origin to the world coordinate system or adjust spacing in an editing process.

Figure 16:
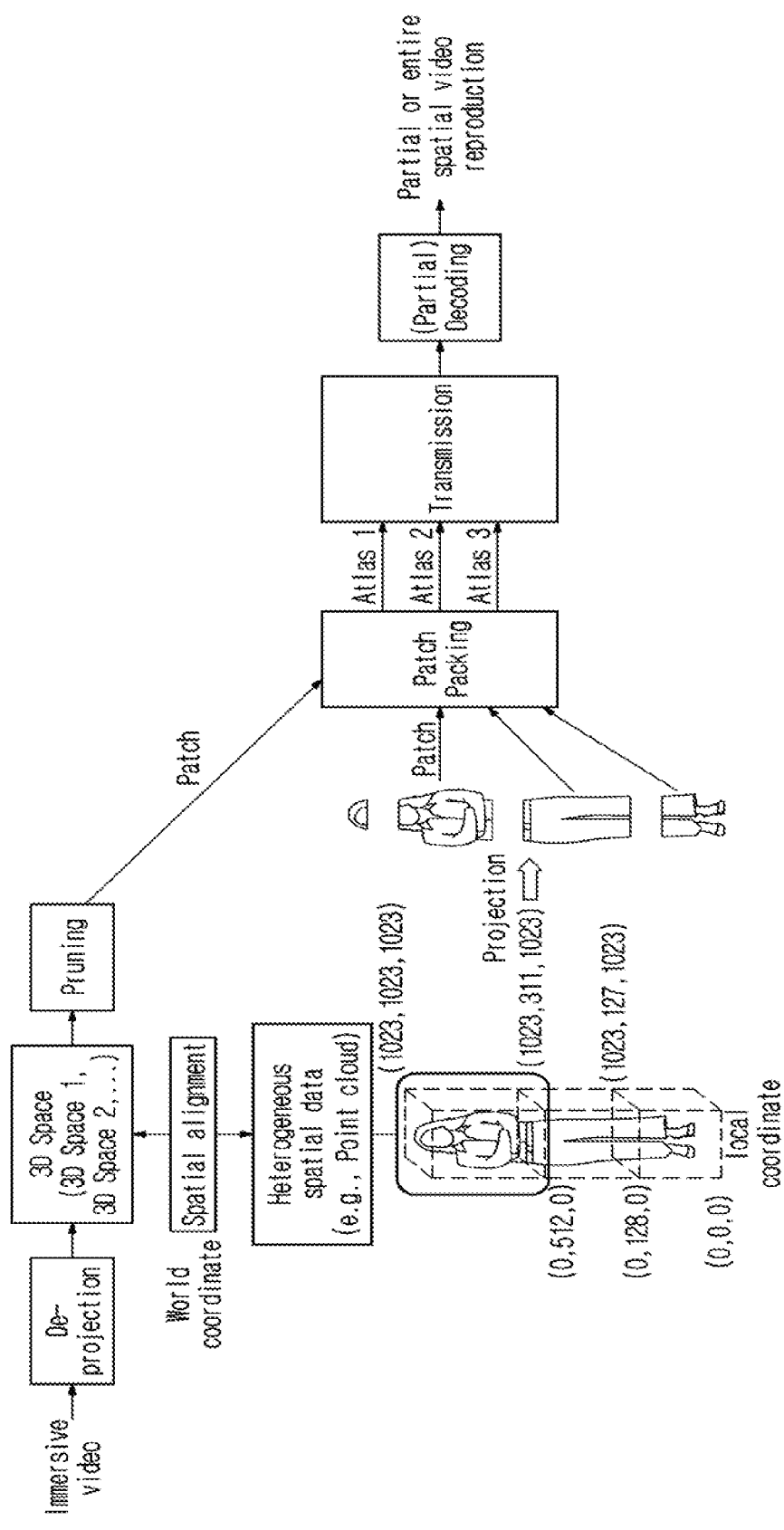
FIG. 16 illustrates an example, in which an immersive video and a heterogeneous media object are aligned in 3D space, and a method of processing a video combined with heterogeneous media.

FIG. 16 illustrates an example, in which an immersive video and a heterogeneous media object are aligned in 3D space, and a method of processing a video combined with heterogeneous media.

When two videos are rendered simultaneously in an immersive video output apparatus by aligning data of an immersive video and point cloud data in 3D space (hereinafter, referred to as spatial alignment), an effect like natural synthesis of the immersive video and the point cloud may be produced.

After spatial alignment, a patch may be generated and the generated patch may be packed through the above-described processes like pruning and projection. Next, when patch data are transmitted in a tile or atlas unit, an immersive video output apparatus may decode the entire or part of the received data and provide a predetermined spatial image to a viewer.

Meanwhile, in the present disclosure, the number of groups may be set to 1. When there is one group, an entire space, in which an immersive video and heterogeneous media like point cloud are combined, may be reproduced without 3D space division.

Figure 17:
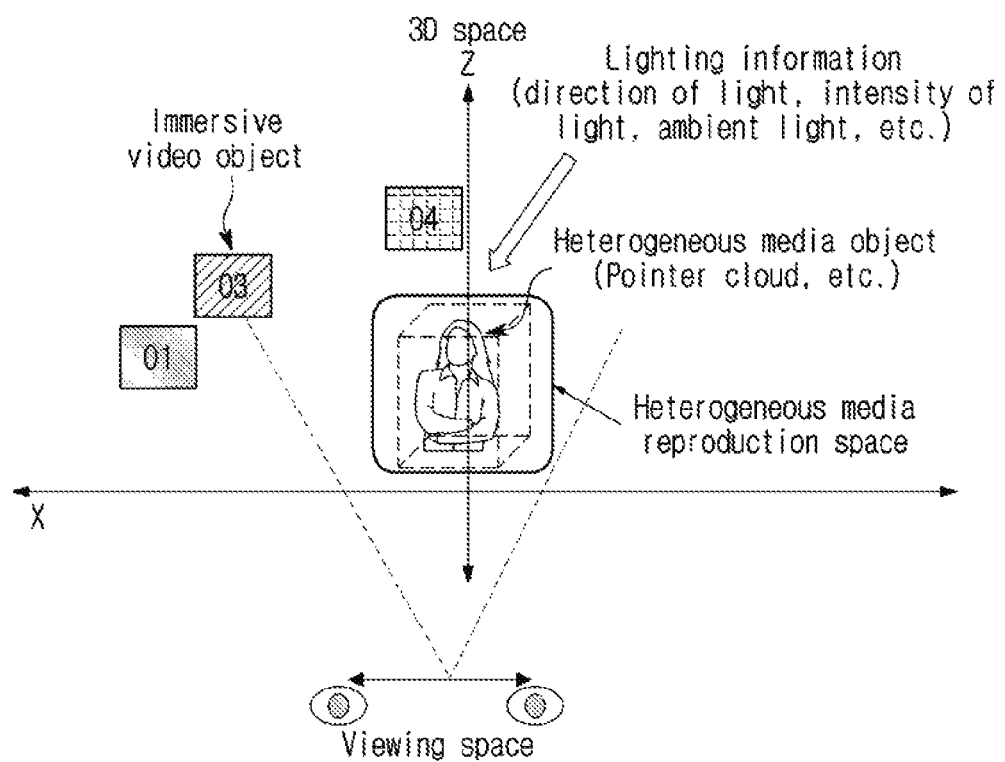
FIG. 17 is a view for describing a method of combining and reproducing an object-based immersive video and heterogeneous media.

FIG. 17 is a view for describing a method of combining and reproducing an object-based immersive video and heterogeneous media.

After an immersive video and heterogeneous media are divided in object units respectively, the immersive video and the heterogeneous media may be encoded through processes such as pruning and patch packing. Herein, an object may be a person in a video, a thing like a building and a car, a foreground image or a background image.

Alternatively, the immersive video may be an omnidirectional nature image, and the heterogeneous medium may be CG or a type (e.g., point cloud) that may be manipulated by a user since it is separately shot/produced. Herein, since objects in the two media are produced in different spaces, under different lights and/or at different times, objects-related information needs to be transmitted as metadata when reproducing the media. Thus, a realistic video may be reproduced as intended by a producer.

Metadata may include information indicating whether or not an immersive and heterogeneous media are jointly encoded. When an immersive video and heterogeneous media are jointly encoded, the metadata may include at least one of an object identifier, a type of media including an object (e.g., immersive video or point cloud), a type of device in which media are to be reproduced, information on transparency and/or reflectance of heterogeneous media object, information on a space of immersive video in which heterogeneous media are to be jointly reproduced (e.g., at least one of spatial position, size, viewing space and user's manipulation range), intensity and/or direction of major light, and information on ambient light. Herein, the information on ambient light may be information on light irradiating around the heterogeneous media object like spherical harmonic. When the information on the ambient light is information on irradiating light, the information may be transmitted in a form of light map. In order to signal an attribute of the light map, an attribute type identifier may be added as shown in Table 10.

TABLE 10

| ai_attribute_type_id[ j ][ i ] | Identifier | Attribute type |
|---|---|---|
| 0 | ATTR_TEXTURE | Texture |
| 1 | ATTR_MATERIAL_ID | Material ID |
| 2 | ATTR_TRANSPARENCY | Transparency |
| 3 | ATTR_REFLECTANCE | Reflectance |
| 4 | ATTR_NORMAL | Normals |
| 5 | ATTR_light_map | Light map |
| 15 | ATTR_UNSPECIFIED | Unspecified |

When a heterogeneous media object that is produced in a different from an immersive video is jointly rendered with the immersive video, a realistic video may be reproduced by rendering the reflectance and shadow of the heterogeneous media object based on at least one of the intensity/direction of light of the immersive video and information on ambient light. As the intensity/direction of light and/or information on ambient light may be calculated through high performance processing based on image, the intensity/direction of light and/or information on ambient light may be extracted beforehand in a production process and be transmitted to a device.

Meanwhile, an immersive video and heterogeneous media may be various types of media like 3 DoF+, 6 DoF, PCC and UHD video, and metadata may be transmitted with various specifications suggested by each standard.

The names of the syntax elements described in the above embodiments are temporarily given in order to describe the embodiments of the present disclosure. Different names from the ones suggested in the present disclosure may be given to syntax elements.

In the above-described embodiments, the methods are described based on the flowcharts with a series of steps or units, but the present disclosure is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present disclosure.

The above-described embodiments include various aspects of examples. All possible combinations for various aspects may not be described, but those skilled in the art will be able to recognize different combinations. Accordingly, the present disclosure may include all replacements, modifications, and changes within the scope of the claims.

The embodiments of the present disclosure may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present disclosure, or well-known to a person of ordinary skilled in computer software technology field. Examples of the computer-readable recording medium include magnetic recording media such as hard disks, floppy disks and magnetic tapes; optical data storage media such as CD-ROMs and DVD-ROMs; magneto-optimum media like floptical disks; and hardware devices, such as read-only memory (ROM), random-access memory (RAM), flash memory, etc., which are particularly structured to store and implement program instructions. Examples of the program instructions include not only a mechanical language code formatted by a compiler but also a high-level language code that may be implemented by a computer using an interpreter. The hardware devices may be configured to be operated by one or more software modules or vice versa to conduct the processes according to the present disclosure.

Although the present disclosure has been described in terms of specific items such as detailed elements as well as the limited embodiments and the drawings, they are only provided to help more general understanding of the disclosure, and the present disclosure is not limited to the above embodiments. It will be appreciated by those skilled in the art to which the present disclosure pertains that various modifications and changes may be made from the above description.

Therefore, the spirit of the present disclosure shall not be limited to the above-described embodiments, and the entire scope of the appended claims and their equivalents will fall within the scope and spirit of the disclosure.

What is claimed is:

1. An immersive video synthesizing method, the method comprising:
    parsing video data and metadata from a bitstream;
    obtaining at least one atlas by decoding the video data; and
    extracting patches required for synthesizing a viewport video based on the metadata,
    wherein the metadata comprise information on pruning priority order between a plurality of views,
    wherein the information comprises a flag which is used for determining whether priority view information for a current view is present in the metadata or not,
    wherein the priority view information comprises number information indicating a number of priority views and identity information specifying at least one priority view of the current view, and
    wherein the at least one priority view is at an upper or lower node of the current view on a pruning graph.

2. The immersive video synthesizing method of claim 1, wherein the viewport video is reconstructed by a weighted sum of the current view and the at least one priority view, and wherein a weight allocated to each of the current view and the at least one priority view is determined based on pruning priority orders of the current view and the at least one priority view.

3. The immersive video synthesizing method of claim 2, wherein a weight allocated to a parent node among the current view and the at least one priority view has a greater value than a weight allocated to a child node among the current view and the at least one priority view.

4. The immersive video synthesizing method of claim 1, wherein the metadata comprises partition information on an atlas, and
wherein the metadata further comprises information for identifying a tile to which a patch in the atlas belongs.

5. The immersive video synthesizing method of claim 1, wherein the metadata further comprises media information for indicating whether or not heterogeneous media data is comprised in the video data, and
wherein, when the media information indicates that the heterogeneous media data is comprised in the video data, the metadata further comprises media information for indicating a type or attribute of the heterogeneous media data.

6. The method of claim 5, wherein, when the media information indicates that the heterogeneous media data is comprised in the video data, the metadata further comprise ambient light information, and
wherein the ambient light information comprises at least one of first ambient light information for a target space in which an object included in the heterogeneous media data is jointly reproduced or second ambient light information of the object included in the heterogeneous media data.

7. The method of claim 1, wherein the metadata further comprises a complete view flag indicating whether the atlas comprises complete information for a specific view or not.

8. An immersive video processing method, the method comprising:
determining a pruning priority order for input videos;
extracting patches from pruned input videos;
generating at least one atlas based on the extracted patches; and
encoding metadata,
wherein the metadata comprise information on the pruning priority order,
wherein the information comprises a flag used for determining whether priority view information for a current view is present in the metadata or not,
wherein the priority view information comprises number information indicating a number of priority views and identity information specifying at least one priority view of the current view, and
wherein the at least one priority view is at an upper or lower node of the current view on a pruning graph.

9. The immersive video processing method of claim 8, wherein the metadata further comprises partition information on an atlas and information for identifying a tile to which the patch in the atlas belongs.

10. The immersive video processing method of claim 8, wherein the metadata further comprises media information for indicating whether or not heterogeneous media data is comprised in the at least one atlas, and
wherein, when the heterogeneous media data is comprised in the at least one atlas, the metadata further comprises media information for indicating a type or an attribute of the heterogeneous media data.

* * * * *